United States Patent
Abu El Ata et al.

(10) Patent No.: US 7,389,211 B2
(45) Date of Patent: *Jun. 17, 2008

(54) SYSTEM AND METHOD OF PREDICTIVE MODELING FOR MANAGING DECISIONS FOR BUSINESS ENTERPRISES

(76) Inventors: Nabil A. Abu El Ata, 117 E. 57th St., New York City, NY (US) 10022; Annie Drucbert, 117 E. 57th St., New York City, NY (US) 10022; Ahmad Abu El Ata, Wiessenstrasse 1, Kusnacht, CH 8700 (CH)

( * ) Notice: Subject to any disclaimer, the term of this patent is extended or adjusted under 35 U.S.C. 154(b) by 552 days.

This patent is subject to a terminal disclaimer.

(21) Appl. No.: 10/838,138

(22) Filed: May 3, 2004

(65) Prior Publication Data

US 2004/0249482 A1 Dec. 9, 2004

Related U.S. Application Data

(63) Continuation-in-part of application No. 10/014,317, filed on Oct. 26, 2001, now Pat. No. 7,031,901, which is a continuation-in-part of application No. 09/127,191, filed on Jul. 31, 1998, now Pat. No. 6,311,144.

(60) Provisional application No. 60/467,483, filed on May 2, 2003, provisional application No. 60/085,350, filed on May 13, 1998.

(51) Int. Cl.
*G06F 7/60* (2006.01)
*G06F 17/10* (2006.01)
*G06F 15/173* (2006.01)
*G06F 9/44* (2006.01)
*G06F 17/50* (2006.01)

(52) U.S. Cl. ............... 703/2; 709/224; 705/7
(58) Field of Classification Search ............ 703/2, 703/21, 22; 709/223, 224, 225; 705/7, 8
See application file for complete search history.

(56) References Cited

U.S. PATENT DOCUMENTS

| 5,146,591 | A | 9/1992 | Bachman et al. |
| 5,193,183 | A | 3/1993 | Bachman |
| 5,195,178 | A | 3/1993 | Krieger et al. |
| 5,208,765 | A | 5/1993 | Turnbull |

(Continued)

OTHER PUBLICATIONS

Sudip Bhattacharjee, R. Ramesh, "Enterprise Computing Environments and Cost Assessment" Communications of the ACM, Oct. 2000/vol. 43, No. 10, pp. 75-82.*

(Continued)

*Primary Examiner*—Paul L Rodriguez
*Assistant Examiner*—Dwin M Craig
(74) *Attorney, Agent, or Firm*—Hamilton, Brook, Smith & Reynolds, P.C.

(57) ABSTRACT

A system and method is provided for predictive modeling of technical and non-technical components in a business infrastructure that implementing one or more business solutions. According to a first aspect of the invention, performance metrics generated from a predictive model of a business infrastructure are translated into enterprise decision or indicators that correspond to the service, performance and financial states of a business enterprise. As a result, non-technical executives can utilize the enterprise decision metrics or indicators to evaluate, support, and monitor the effect of business decisions, for example, with respect to profitability, productivity, growth, and risk of the business. According to a second aspect of the invention, the accuracy of the predictive modeling is improved by mathematically expressing the dynamic characteristics and behavior of each infrastructure component as a result of direct and indirect effects of the infrastructure components impacting one another. Perturbation theory can be used to express direct and indirect effects.

8 Claims, 29 Drawing Sheets

U.S. PATENT DOCUMENTS

| | | | |
|---|---|---|---|
| 5,233,513 | A | 8/1993 | Doyle |
| 5,241,645 | A | 8/1993 | Cimral et al. |
| 5,276,877 | A | 1/1994 | Friedrich et al. |
| 5,297,279 | A | 3/1994 | Bannon et al. |
| 5,446,874 | A | 8/1995 | Waclawsky et al. |
| 5,486,995 | A | 1/1996 | Krist et al. |
| 5,522,014 | A | 5/1996 | Clark et al. |
| 5,539,652 | A | 7/1996 | Tegethoff |
| 5,680,590 | A | 10/1997 | Parti |
| 5,701,400 | A * | 12/1997 | Amado .................. 706/45 |
| 5,724,556 | A | 3/1998 | Souder et al. |
| 5,724,569 | A | 3/1998 | Andres |
| 5,726,914 | A | 3/1998 | Janovski et al. |
| 5,729,746 | A | 3/1998 | Leonard |
| 5,771,370 | A | 6/1998 | Klein |
| 5,790,789 | A | 8/1998 | Suarez |
| 5,801,958 | A | 9/1998 | Dangelo et al. |
| 5,809,282 | A | 9/1998 | Cooper et al. |
| 5,822,749 | A | 10/1998 | Agarwal |
| 5,881,268 | A | 3/1999 | McDonald et al. |
| 5,893,074 | A | 4/1999 | Hughes et al. |
| 5,937,165 | A | 8/1999 | Schwaller et al. |
| 5,953,707 | A | 9/1999 | Huang et al. |
| 5,958,009 | A | 9/1999 | Friedrich et al. |
| 5,984,511 | A | 11/1999 | Vasey-Glandon et al. |
| 5,999,734 | A | 12/1999 | Willis et al. |
| 6,003,079 | A | 12/1999 | Friedrich et al. |
| 6,009,256 | A | 12/1999 | Tseng et al. |
| 6,023,706 | A | 2/2000 | Schmuck et al. |
| RE36,602 | E | 3/2000 | Sebastian et al. |
| 6,038,540 | A | 3/2000 | Krist et al. |
| 6,067,412 | A | 5/2000 | Blake et al. |
| 6,115,718 | A | 9/2000 | Huberman et al. |
| 6,119,125 | A | 9/2000 | Glouderman et al. |
| 6,145,121 | A | 11/2000 | Levy et al. |
| 6,272,507 | B1 | 8/2001 | Pirolli et al. |
| 6,311,144 | B1 | 10/2001 | Abu El Ata |
| 6,327,551 | B1 | 12/2001 | Peterson et al. |
| 6,345,239 | B1 | 2/2002 | Bowman-Amuah |
| 6,370,681 | B1 | 4/2002 | Dellarocas et al. |
| 6,393,386 | B1 | 5/2002 | Zager et al. |
| 6,427,132 | B1 | 7/2002 | Bowman-Amuah |
| 6,560,569 | B1 | 5/2003 | Abu El Ata |
| 6,611,867 | B1 | 8/2003 | Bowman-Amuah |
| 7,031,901 | B2 * | 4/2006 | Abu El Ata .................. 703/21 |
| 2003/0120361 | A1 * | 6/2003 | Anderson et al. ............. 700/31 |
| 2004/0128618 | A1 | 7/2004 | Datta |

OTHER PUBLICATIONS

Rolia, J.A. and K.C. Sevcik, "The Method of Layers," *IEEE Transactions on Software Engineering* 21(8):689-700, Aug. 1995.
"BMC Software BEST/1," http://www.bgs.com (Updated: Apr. 10, 1998), 1 pg.
"About BEST/1," http://www.bgs.com/bgs.htm (Printed Out: May 21, 1998) 1 pg.
"BMC Software to Acquire BGS Systems," http://www.bgs.com/bmcbgs.htm (Printed Out: May 21, 1998), 3 pgs.
"Performance and Capacity Management, BEST/1-Visualizer for AS/400," http://www.bgs.com/as400/as4_home.htm (Printed: May 21, 1998), 2 pgs.
"BEST/1-Visualizer for AS/400, Product Description," http://www.bgs.com/as400/Slid_2.html (Printed Out: May 21, 1998), 2 pgs.
"BEST/1-Visualizer for AS/400, Bottleneck Detection and Analysis," http://www.bgs.com/as400/Slid_3.html (Updated: Nov. 22, 1996), 2 pgs.
"BEST/1-Visualizer for AS/400, Threshold Exception Reporting," http://www.bgs.com/as400/Slid_4.html (Updated: Jan. 23, 1997), 2 pgs.
"BEST/1-Visualizer for AS/400, Track and Trend Long-term Performance," http://www.bgs.com/as400/Slid_6.html (Printed Out: May 21, 1998) 2 pgs.
"BEST/1-Visualizer for AS/400, CPU/System Graphs," http://www.bgs.com/as400/Slid_8.html (Updated: Nov. 29, 1996, 2 pgs.
"BEST/1-Visualizer for AS/400, I/O Subsystem Graphs," http://www.bgs.com/as400/Slid_9.html (Updated: Nov. 30, 1996), 2 pgs.
"BEST/1-Visualizer for AS/400, Storage Pool Graphs," http://www.bgs.com/as400/Slid_11.html (Updated: Nov. 22, 1996), 2 pgs.
"BEST/1-Visualizer for AS/400, Communication Line Graphs," http://www.bgs.com/as400/Slid_12.hmtl (Updated: Nov. 30, 1996), 2 pgs.
"BEST/1-Visualizer for AZ/400, Job Graphs," http://www.bgs.com/as400/Slid_13.html (Updated: Jan. 22, 1997) 2 pgs.
"The Portable Simulation Initiative and the Common Modeling Framework," http://www.ses.com/psi-cmf.html (Updated: Apr. 3, 1998), 3 pgs.
"SES—Products and Services: Why Simulate?" http://www.ses.com/whysimulate.html (Updated: Apr. 2, 1998), 7 pgs. from *Capacity Management Review*, vol. 36, No. 2, Feb. 1998.
"SES in the Press," http://www.ses.com/news/html (Updated: Apr. 8, 1998), 3 pgs.
"SES Inc. Announces Release of Strategizer," http://www.ses.com/pr_archive/010297.html (Updated: July 14, 1997, 2 pgs.
"SES Releases SES/Workbench 3.1," http://www.ses.com/pr_archive/022896.html (Updated Jul. 14, 1997), 3 pgs.
"SES/workbench: Workbench Overview," http://www.ses.com/workbench.html (Updated: Feb. 10, 1998), 3 pgs.
"SES/objectbench: Batch Execution," http://www.ses.com/Objectbench/sim_details_batch.html (Updated: Apr. 6, 1998), 2 pgs.
"SES/objectbench: The Objectbench Animated Simulator," http://www.ses.com/Objectbench/simulator.html (Updated: Apr. 15, 1998), 2 pgs.
"SES/objectbench," http://www.ses.com/Objectbench/index.html (Updated Apr. 6, 1998), 2 pgs.
EETimes: Intel, Others Eye Performance Modeling Standard, http://www.techweb.com/se/directlink.cgi?EET19971103S0105 (Nov. 3, 1997), 2 pgs.
"Euroexpert: GATE[TN]," Euroexpert SA, Antony, France (Sep. 1, 1997), 2 pgs.
"Euroexpert: Best Practices: Milan Stock Exchange," Euroexpert SA, Antony, Fanece (Sep. 1, 1007), 2 pgs.
"Euroexpert: Best Practices: France Telecom," Euroexpert SA, Antony, France (Sep. 1, 1997), 2 pgs.
"Simulation modeling within workflow technology," Miller, et al., Proceedings of the 1995 Winter Simulation Conference, Dec. 3-6, 1995.
"Analyzing and re-engineering business process using simulation," Bhskar, et al., Proceeding of the 1994 Winter Simulation Conference, Dec. 11-14, 1994.
"BEST/1-Visualizer for AS/400, Workload Analysis," http://www.bgs.com/as400/Slid_5.html (Updated: Jan. 23, 1997), 2 pgs.
Gunther, N., "The Practical Performance Analyst", *Performance-by-Design Techniques for Distributed Systems*, McGraw-Hill, Table of Contents only consisting of 9 pages, 1998.
"Model Driver Architecture (MDA) Document number ormsc/Jul. 1, 2001", Architecture Board ORMSC[1], pp. 1-31, Jul. 2001.
Grady, R., et al., "Software Metrics: Establishing A Company-Wide Program", Prentice-Hall, Inc., Table of Contents only, consisting of 5 pgs., 1987.
Jacobson, I., et al., "Software Reuse", *Architecture Process and Organization for Business Success*, ACM Press, Table of Contents only, consisting of 9 pages, Addison-Wesley, 1997.
Bontempo, et al., "Data Management Principles and Products", Prentice Hall, Inc., 1995, Table of Contents only consisting of 10 pages.
Soley, R., et al., "Model Driven Architecture" *Object Management Group*, pp. 1-12 (Nov. 27, 2000).
Hutchins, G., "ISO 9000, A Comprehensive Guide to Registration, Audit Guidelines, and Successful Certification" (Oliver Wight Publications, Inc.) 1993, Table of Contents Only consisting of 5 pages.

Lazowska, E., et al., "Quantitative System Performance: *Computer System Analysis Using Queueing Network Models*", Prentice-Hall, Inc., 1984, Table of Contents Only consisting of 8 pages.

Beck, K., "Extreme Programming Explained", Addison-Wesley 2000, Table of Contents Only consisting of 7 pages.

Sarris, D., et al., "The White Papers: *Capacity Planning for e-Commerce Systems With Benchmark Factory™*", http://www.quest.com/whitepapers/cap_plan_Ecomm.pdf, pp. 1-19, no date given.

Leymann, F., et al, "Production workflow: concepts and techniques", 2000, Table of Contents Only consisting of 14 pages.

"Pyramid: Quantitative management: get a grip on software!" 100 pages, 1991.

Shaw, M., et al., "Software Architecture: *Perspectives on an Emerging Discipline*", Prentice Hall 1996, Table of Contents only consisting of 7 pages.

"EuroExpert GATE™ Model Product Description: *A predictive approach to efficient information systems*", pp. 1-21, 1994.

Ata, N., "How we Avoided Murphy's Law at the Italian Stock Exchange", CMG 1997, consisting of 7 pages.

Ata, N., "How Metrics and Models Made Architecture Real," presented at DCI Conference in Washington, D.C. in Feb. 2000 (slides 1-21).

Ata, N., "A Predictive Modeling Approach to Developing Complex Systems," presented at CSC Leading Edge Forum Conference on Mar. 6, 2001 (slides 1-35).

Menasce, D., et al., "Capacity Planning and Performance Modeling", 1994, Prentice-Hall, ISBN 0-13-035494-5.

Agrawal, S., et al., "The aggregate server method for analyzing serialization delays in computer systems", ACM Transactions on Computer Systems, vol. 1, Issue 2, pp. 116-143, May 1983, ISSN: 0734-2071.

Compaq Open VMS Documentation, "TCP/IP Networking on Open VMS Systems", Nov. 1996, URL: http://www.openvms.compaq.com:8000/ssb71/6436p.htm.

Altmann, M., "A list of software for computer simulations", Last updated, Nov. 11, 1996. URL: http://www.nmsr.labmed.umn.edu/~michael/dbase/outgoing/FAQ.html.

Keshav, S., "Real 5.0 Overview", Aug. 13, 1997, URL: http://www.cs.cornell.edu/skeshav/real/overview.html.

Keshav, S., "Real 5.0 User Manuel", Aug. 13, 1997, URL: http://www.cs.cornell.edu/skeshav/real/user.html.

Keshav, S., "Real 5.0 Programmer's Manual", Aug. 13, 1997, URL: http://www.cs.cornell.edu/skeshav/real/prog.html.

Keshav, S., "Real 5.0 Changes", Aug. 13, 1997, URL: http://www.cs.cornell.edu/skeshav/real/changes.html.

Keshav, S., "Real 4.0 Programmer's Manual", Oct. 21, 1993, URL: http://minnie.cs.adfa.oz.au/REAL/prog.asc.gz.

Keshav, S., "Real 4.0 User's Manual", Oct. 21, 1993, URL: http://minnie.cs.adfa.oz.au/REAL/user.asc.gz.

Eureka Project E!636. URL: http://www3.eureka.be/Home/projectdb/PrjFormFrame.asp?pr_id=636.

Choukri, T., "cv_choukri.htm", 1999. URL:http://www.global-coms.com/consultants/cv_choukri.htm.

US. Trademark Electronic Search System, search result for Trademark Serial No. 74555204. Nov. 27, 2001.

Ata, N., "A Predictive Modeling Approach to Developing Complex Systems", CSC Leading Edge Forum, Mar. 6, 2001, URL: http://www2.csc.com/lef/programs/forum/mar_01.htm.

Ata, N., "System Performance Modeling", ITC Meeting Minutes, Dec. 2, 1999, URL: http://www.istis.unomaha.edu/itc/meetings/m991202.htm.

Ata, N., "CMG97 Session Descriptions by Subject Area", CMG97 Orlando, The Computer Measurement Group's 1997 Int'l Conference, Dec. 7-12, 1997, URL: http://www.cmg.org/cmg97/cmg97sessions.html and http://www.cmg.org/cmg97/97Workload.pdf.

* cited by examiner

FIG. 6F

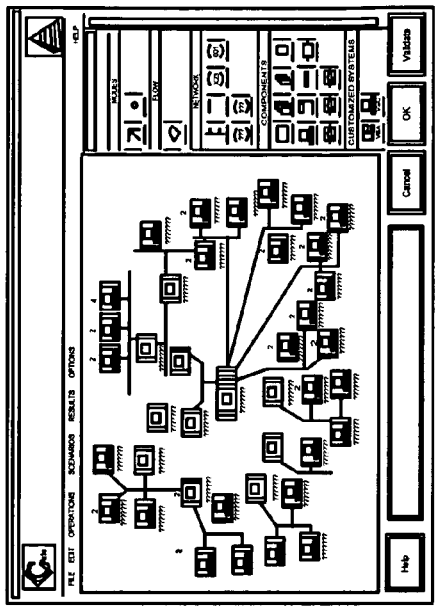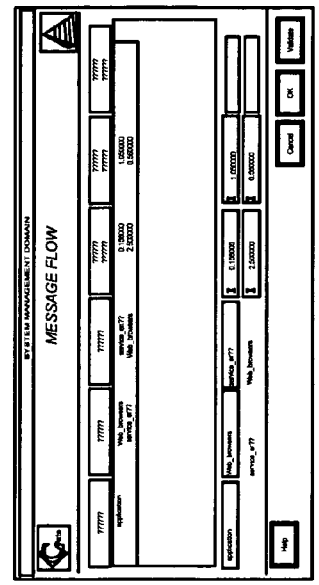
FIG. 6H

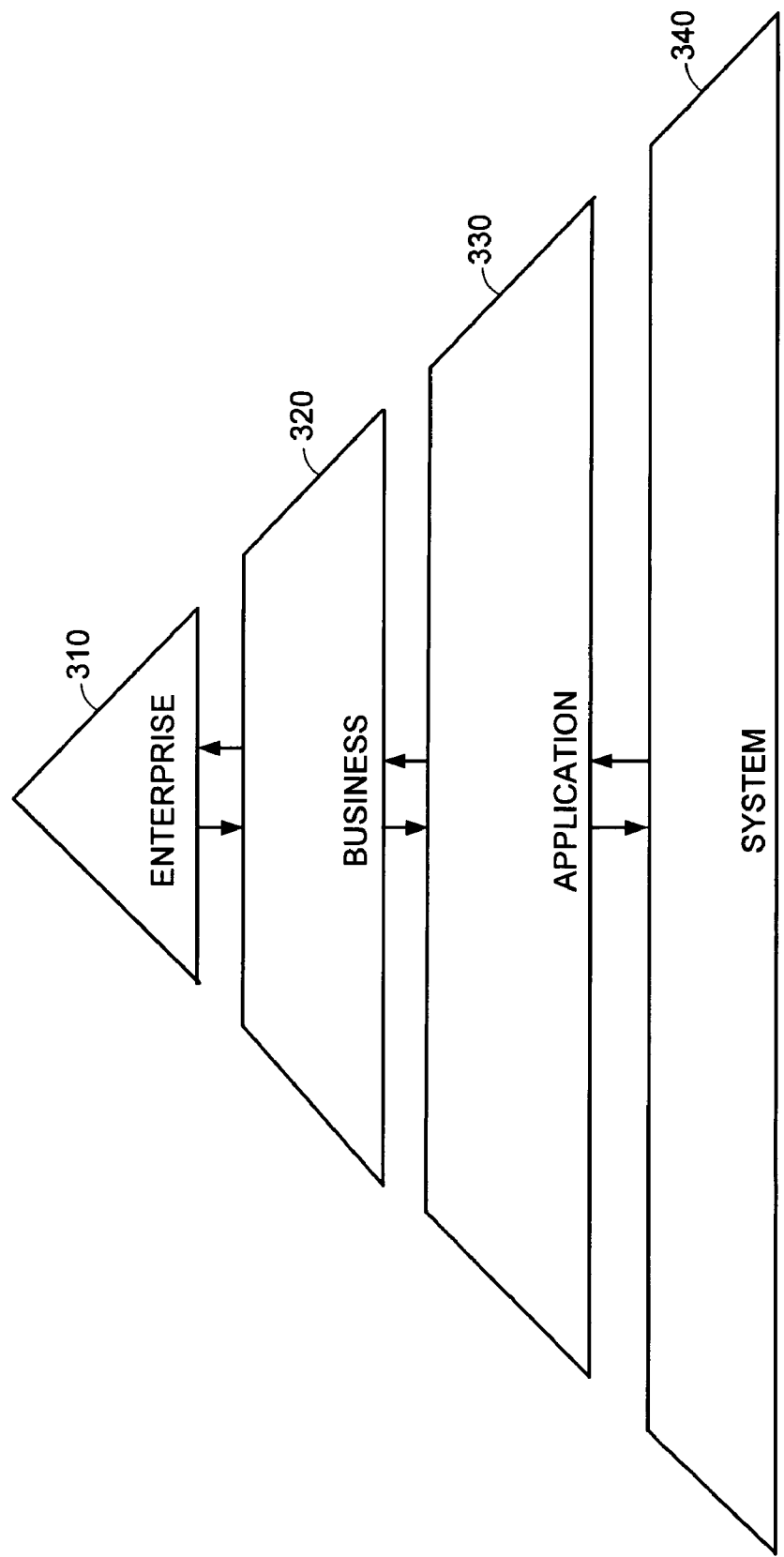

BUSINESS - KEY PERFORMANCE PARAMETERS ARE VERIFIABLE AGAINST LAB RESULTS

APPLICATIONS - KEY PERFORMANCE PARAMETERS ARE VERIFIABLE AGAINST LAB RESULTS

APPLICATION MANAGEMENT DOMAIN

APPLICATION RESULTS

| Application | Response Time | Elongation |
|---|---|---|
| ORDER | 12.35442 | 0.98268 |
| UPDATE | 0.71376 | 6.27259 |
| ORDERSINGLE | 12.29366 | 0.99707 |
| UPDATSINGLE | 2.77670 | 134.94204 |
| NOTIFICATION | 3.36721 | 2.55148 |
| INQUIRY | 44.13863 | 0.84177 |
| BROADCAST | 8.68724 | 27.86479 |

| Application | Server | Response Time (sec) | Elongation | %GRU | Number of I/Os | CPU Time per I/O | CPU Time per transaction | Number of I/O per transaction |
|---|---|---|---|---|---|---|---|---|
| AGENT | FRONT-END | 0.00021 | 38.00294 | 1.66420 | 0.20279 | 0.08207 | 0.00013 | 0.00155 |
| AGENT | FRONT-END | 0.00021 | 37.99946 | 1.66420 | 0.20279 | 0.08207 | 0.00013 | 0.00155 |
| AGENT | FRONT-END | 0.00021 | 38.00299 | 1.66420 | 0.20279 | 0.08207 | 0.00013 | 0.00155 |
| AGENT | FRONT-END | 0.00021 | 37.47112 | 1.66420 | 0.20279 | 0.08207 | 0.00013 | 0.00155 |
| NEGC | BACK-END | 0.03596 | 4.09107 | 1.71885 | 2.38449 | 0.00721 | 0.01802 | 2.49973 |
| ACMSL | BACK-END | 0.00768 | 0.91590 | 0.05835 | 0.72806 | 0.00680 | 0.00083 | 1.03234 |

Help  Close

FIG. 8B

INFRASTRUCTURE -- KEY PERFORMANCE PARAMETERS ARE VERIFIABLE AGAINST LAB RESULTS

SYSTEM MANAGEMENT DOMAIN

NETWORK DETAILS

| Name | Source | Destination | Response time(s) | Basic time(s) | Elongation (%) |
|---|---|---|---|---|---|
| ORDER | MILAN 2 | BACK-END | 1.7852 | 1.7410 | 2.5958 |
| ORDERSINGLE | MILAN-2 | BACK-END | 1.9963 | 1.9500 | 2.3752 |
| BROADCAST | MILAN 2 | BACK-END | 1.7185 | 1.1403 | 50.7046 |
| NOTIFICATION | MILAN 2 | BACK-END | 0.8982 | 0.8489 | 5.8145 |
| INQUIRY | MILAN 2 | BACK-END | 0.4520 | 0.4206 | 7.4749 |

| Item | Response time(s) | Basic time(s) | Elongation (%) |
|---|---|---|---|
| MILAN 2 | 0.0030 | 0.0030 | 0.0000 |
| Board | 0.0032 | 0.0030 | 7.6082 |
| Link | 0.0000 | 0.0000 | 0.0000 |
| 155-2 | 0.0093 | 0.0092 | 0.9248 |
| L1-5-2 | 0.0069 | 0.0069 | 0.2251 |
| x25 | 0.2180 | 0.2180 | 0.0000 |
| L2-5-2 | 0.0069 | 0.0069 | 0.2251 |
| x25aff5-2 | 0.0235 | 0.0229 | 2.6490 |
| Ethernet07 | 0.0002 | 0.0002 | 7.2942 |
| Board | 0.0000 | 0.0000 | 15.9337 |
| decnis03 | 0.0001 | 0.0001 | 0.0000 |
| DECNET | 0.0002 | 0.0001 | 92.8682 |
| DECNET2 | 0.0009 | 0.0009 | 0.1441 |
| Board | 0.0002 | 0.0001 | 92.8682 |
| decnis04 | 0.0001 | 0.0001 | 0.0000 |
| Board | 0.0000 | 0.0000 | 15.9337 |
| Ethernet01 | 0.0002 | 0.0002 | 16.8237 |
| dsifel-eth | 0.0002 | 0.0001 | 25.3625 |
| FRONT-END | 0.0794 | 0.0578 | 37.4712 |
| Ethernet01 | 0.0002 | 0.0002 | 16.8237 |
| Board | 0.0000 | 0.0000 | 49.5314 |
| BACK-END | 0.0668 | 0.0664 | 0.6835 |
| Board | 0.0002 | 0.0002 | 7.8414 |
| Ethernet01 | 0.0035 | 0.0033 | 4.2280 |
| dsifel-eth | 0.0008 | 0.0007 | 25.3625 |
| Ethernet01 | 0.0035 | 0.0033 | 4.2280 |
| Board | 0.0006 | 0.0006 | 2.8259 |
| Board | 0.0035 | 0.0030 | 15.3051 |
| DECNET2 | 0.0172 | 0.0167 | 3.4460 |
| DECNET | 0.0035 | 0.0030 | 15.3051 |
| Board | 0.0006 | 0.0006 | 2.6259 |
| Ethernet02 | 0.0034 | 0.0033 | 1.8331 |
| x25af5-2 | 0.0677 | 0.0649 | 4.4484 |
| L2-5-2 | 0.1384 | 0.1302 | 6.3373 |
| x25 | 1.0727 | 1.0727 | 0.0000 |

[ Help ]   [ Cancel ]   [ OK ]   [ Validate ]

COMMUNICATIONS

FIG. 8C

DATABASES-KEY PERFORMANCE PARAMETERS ARE VERIFIABLE AGAINST LAB RESULTS

APPLICATION MANAGEMENT DOMAIN

SERVERS CACHE ACTIVITY

| Group Name | Total CPU time (ms) | Number of Cache I/O | Hit Ratio (%) |
|---|---|---|---|
| engagement6 | 855.27639 | 196.16698 | 56.21209 |
| liquidation10 | 4983.09524 | 1875.69681 | 50.77177 |
| imp16 | 6159.57431 | 1591.37453 | 34.75656 |
| mandatement13 | 9583.85993 | 2075.06632 | 55.68711 |
| mandatement14 | 0.00000 | 0.00000 | NaN |
| liquidation9 | 0.00000 | 0.00000 | NaN |
| engagement7 | 9472.73482 | 2175.73342 | 65.43662 |
| liquidation11 | 10842.14697 | 4131.91852 | 55.74395 |
| liquidation12 | 1803.41752 | 85.50973 | 64.99604 |
| imp17 | 3771.13665 | 1026.83222 | 34.88745 |
| imp18 | 1495.35069 | 386.84528 | 75.85736 |
| imp19 | 1977.46071 | 386.84528 | 75.85736 |
| virmod15 | 0.00000 | 0.00000 | NaN |
| credit1 | 2658.52952 | 863.16819 | 55.69317 |
| credit2 | 17971.68577 | 6835.48364 | 61.51389 |
| credit3 | 3186.78991 | 319.15066 | 15.56861 |
| partenaire4 | 1672.07127 | 567.17306 | 52.45585 |
| partenaire5 | 2273.57079 | 764.23490 | 59.55519 |
| 7engagement6 | 860.86872 | 45.17778 | 97.15606 |
| 7liquidation10 | 906.42316 | 38.76319 | 97.43399 |
| 7imp16 | 2716.05361 | 16.95267 | 98.93281 |
| 7mandatement13 | 7777.32529 | 59.96592 | 99.68402 |
| 7mandatement14 | 0.00000 | 0.00000 | NaN |
| 7liquidation9 | 0.00000 | 0.00000 | NaN |
| 7engagement7 | 5618.92933 | 128.40905 | 98.53676 |
| 7liquidation11 | 2113.21460 | 100.95001 | 98.12612 |
| 7liquidation12 | 2069.35171 | 24.18887 | 98.66243 |
| 7imp17 | 1747.56868 | 13.49255 | 99.33856 |
| 7imp18 | 784.94754 | 0.44939 | 99.96897 |
| 7imp19 | 1224.02700 | 0.44939 | 99.96897 |
| Virmag15 | 0.00000 | 0.00000 | NaN |

| Cache Name | Number of Cache I/O | Hit Ratio (%) |
|---|---|---|
| a | 186.16324 | 56.17170 |
| b | 1.69114 | 98.85657 |
| c | 0.43890 | 98.84142 |
| d | 0.43820 | 98.84307 |
| e | 0.43769 | 98.84462 |
| f | 0.43714 | 98.84641 |
| g | 0.43662 | 98.84762 |
| h | 0.30328 | 99.05233 | sp2

Help    Cancel    OK    Validate

MODEL DRIVEN DECISION METRICS 1/4

| CATEGORY | METRIC | CAUSES (VARIABLES) |
|---|---|---|
| DECISION IMPORTANT<br>LEVEL TECHNICAL | ELONGATION RATIO<br>A MEASURE OF DELAYS BEYOND AND INDEPENDENT ON THE ACTUAL RESOURCE REQUIREMENT<br>TECHNICAL, BUSINESS INDICATOR | DIRECT<br>• CONCURRENT IMPACT OF THE SAME TYPE TRANSACTION ON RESOURCES<br>• CONTENTIONS AND LOCKS ON THE SLOWEST RESOURCES<br>INDIRECT<br>• IMPACT OF OTHER CONCURRENT TRANSACTIONS ON SAME RESOURCES |
| DECISION URGENT<br>LEVEL TECHNICAL | UNIT UTILIZATION RATIO<br>AMOUNT OF ANY RESOURCE UTILIZATION PER UNIT OF ACTIVITY AND PER UNIT OF TIME<br>BUSINESS, CORPORATE, TECHNICAL INDICATOR | DIRECT<br>• VOLUMES IN THE MIX AND RESOURCE(S) SPEED TO DELIVER<br>INDIRECT<br>• SYSTEM ARCHITECTURE, APPLICATION AND DATA DESIGNS |
| DECISION URGENT<br>LEVEL CORPORATE | CEILING THRESHOLD<br>PHYSICAL CONDITIONS BEYOND WHICH SERVICE BECOMES UNACCEPTABLE IN COST AND/OR QUALITY<br>BUSINESS, CORPORATE INDICATOR | DIRECT<br>• CAPACITY OF RESOURCES, DEPLOYMENT AND DESIGN<br>INDIRECT<br>• BUSINESS PROCESS DESIGN AND DEPLOYMENT |
| DECISION IMPORTANT<br>LEVEL BUSINESS | BUSINESS RESPONSE TIME<br>END-TO-END RESPONSE TIME THAT INCLUDE IT AND NON IT DELAYS TO ENTIRELY PERFORM THE PROCESS<br>BUSINESS, CORPORATE AND TECHNICAL INDICATOR | DIRECT<br>• BUSINESS CONSTRAINTS, BUSINESS DEPLOYMENT<br>• IT EFFICIENCY, NON IT EFFICIENCY<br>INDIRECT<br>• BUSINESS APPLICATION DESIGN AND INTRA-PROCESS CONTENTIONS |

FIG. 9A

MODEL DRIVEN DECISION METRICS 2/4

| CATEGORY | METRIC | CAUSES (VARIABLES) |
|---|---|---|
| DECISION URGENT<br>LEVEL CORPORATE | AGING RATIO<br>THE DIFFERENTIAL OF REQUIRED RESOURCES TO DELIVER THE SAME WORKLOAD OVER TIME<br><br>A FINANCIAL AND CORPORATE INDICATOR | DIRECT<br>• STATIC AND DYNAMIC COMPLEXITY<br>• MAINTENANCE (FUNCTIONAL, CORRECTIVE, ADAPTIVE)<br>INDIRECT<br>• DESIGN, IMPLEMENTATION, MANAGEMENT |
| DECISION IMPORTANT<br>LEVEL TECHNICAL FINANCIAL | DEGRADATION RATIO<br>THE DIFFERENTIAL OF THE SCARCE RESOURCE UTILIZATION / SLOWEST RESOURCE UTILIZATION<br><br>A FINANCIAL, TECHNICAL AND CORPORATE INDICATOR | DIRECT<br>• INCREASING DISPARITY BETWEEN RESOURCES SPEEDS<br>• AGING, NON-OPTIMIZED OPERATIONS<br>INDIRECT<br>• DESIGN AND OPERATIONS DEGREDATION |
| DECISION URGENT<br>LEVEL CORPORATE | NON PRODUCTIVE RATIO<br>FRACTION OF NON-WORKLOAD-RELATED RESOURCE UTILIZATION/TOTAL RESOURCE UTILIZATION<br><br>EFFICIENCY AND BUSINESS INDICATOR | DIRECT<br>• MAINTENANCE, AGING AND CODE INEFFICIENCY<br>• NONFUNCTIONAL REQUIREMENTS<br>INDIRECT<br>• DESIGN, INFRASTRUCTURE, ACCESS STRATEGIES |
| DECISION IMPORTANT<br>LEVEL BUSINESS | PROCESS LATENCY<br>FRACTION OF TIME THE PROCESS EVENT IS WAITING FOR PROCESSING<br><br>A QUALITY AND BUSINESS INDICATOR | DIRECT<br>• PROCESS DESIGN AND DEPLOYMENT<br>• INFRASTRUCTURE DESIGN<br>INDIRECT<br>• CONTENTION WITH OTHER PROCESSES |

FIG. 9B

MODEL DRIVEN DECISION METRICS 3/4

| CATEGORY | METRIC | CAUSES (VARIABLES) |
|---|---|---|
| DECISION IMPORTANT<br>LEVEL CORPORATE | COST INFLATION RATE<br>THE DIFFERENTIAL OF THE COST PER TRANSACTION OVER TIME<br><br>BUSINESS AND CORPORATE INDICATOR | DIRECT<br>• AGING, MANAGEMENT OVERHEAD, COMPLEXITY<br>• TECHNOLOGY OBSOLESCENCE, HIGH MAINTENANCE<br><br>INDIRECT |
| DECISION URGENT<br>LEVEL CORPORATE FINANCE | MARGIN EROSION RATE<br>THE DIFFERENTIAL OF MARGIN OVER TIME<br><br>CORPORATE INDICATOR | DIRECT<br>• COST INFLATION<br>• REVENUE RECONFIGURATION<br><br>INDIRECT<br>• COMPETITION, ARCHITECTURE, PRODUCTION IMPERATIVES |
| DECISION URGENT<br>LEVEL CORPORATE FINANCIAL | TOTAL-ADDED-COST RATIO<br>THE DIFFERENTIAL OF THE TOTAL COST OF OWNERSHIP/ THE TOTAL REVENUE<br><br>A FINANCIAL AND CORPORATE INDICATOR | DIRECT<br>• TECHNOLOGY SELECTION, EVOLUTION AND ADOPTION<br>• ARCHITECTURE DESIGN AND IMPLEMENTATION<br><br>INDIRECT<br>• BUSINESS: PRESSURE, COMPETITIVENESS |
| DECISION IMPORTANT<br>LEVEL FINANCE | UNCOVERED-VALUE RATIO<br>THE FRACTION OF CAPITALIZED EXPENSES NON COVERED BY BUSINESS INCOME<br><br>A FINANCIAL AND CORPORATE INDICATOR | DIRECT<br>• FAILURE/ DELAYS AND BUDGET INFLATION OF PROJECTS<br>• BUSINESS EVENT<br><br>INDIRECT<br>• GOVERNANCE |

FIG. 9C

MODEL DRIVEN DECISION METRICS 4/4

| CATEGORY | METRIC | CAUSES (VARIABLES) |
|---|---|---|
| DECISION IMPORTANT<br>LEVEL TECHNICAL | UNDER-UTILIZATION RATIO<br>THE FRACTION OF AVAILABLE UNUSED RESOURCES<br><br>TECHNICAL AND CORPORATE INDICATOR | DIRECT<br>• AGING, NON-PRODUCTIVE RATIO<br>• DEGRADATION RATIO, EFFICIENCY RATIO<br><br>INDIRECT<br>• OPERATIONAL DESIGN |
| DECISION URGENT<br>LEVEL TECHNICAL | OPERATIONAL RISK RATIO | DIRECT<br><br>INDIRECT |
| DECISION URGENT<br>LEVEL CORPORATE TECHNICAL | INEFFICIENCY RATIO<br>THE FRACTION OF RESOURCES STRICTLY NON-PROPORTIONAL TO BUSINESS. LOAD INDEPENDENT UTILIZATION<br><br>TECHNICAL AND CORPORATE INDICATOR | DIRECT<br>• APPLICATION, DATA, SYSTEM IMPLEMENTATION CLEANSING AND REORGANIZATION<br><br>INDIRECT<br>• RE-ARCHITECTURE, REENGINEERING |
| DECISION IMPORTANT<br>LEVEL BUSINESS | LIFETIME CONTRACTION RATIO<br>THE DECREASE IN ACTUAL CEILING TIME SPAN BEFORE HITTING END-OF-LIFE OPERATIONAL CONDITIONS<br><br>FINANCIAL, BUSINESS AND CORPORATE INDICATOR | DIRECT<br>• APPLICATION, DATA, SYSTEM IMPLEMENTATION CLEANSING AND REORGANIZATION<br><br>• REENGINEERED, REJUVINATED COMPONENTS<br>INDIRECT |

FIG. 9D

-------- INDIRECT PERTURBATION EFFECT
———— DIRECT PERTURBATION EFFECT

SYSTEM AND METHOD OF PREDICTIVE
MODELING FOR MANAGING DECISIONS
FOR BUSINESS ENTERPRISES

RELATED APPLICATIONS

This application is a continuation-in-part of U.S. application Ser. No. 10/014,317, filed Oct. 26, 2001, now U.S. Pat. No. 7,031,901 which is a continuation-in-part of application Ser. No. 09/127,191, filed Jul. 31, 1998 (now U.S. Pat. No. 6,311,144), which claims the benefit of U.S. Provisional Application No. 60/085,350, filed on May 13, 1998. This application also claims the benefit of U.S. Provisional Application No. 60/467,483, filed May 2, 2003. The entire teachings of the above applications are incorporated herein by reference.

BACKGROUND

Business infrastructures are designed to support business enterprises and the solutions they provide. A business infrastructure includes technological as well as non-technological components. Technological components include hardware and software components that implement an underlying information technology (IT) infrastructure for one or more business processes. Non-technological components include the organizational structure and operation of the business enterprise and manual business processes. The architectures of business infrastructures are generally required to handle varying degrees of workload and priorities under imposed business constraints.

The design of business infrastructures having such requirements and constraints represents a real challenge. Most existing methodologies, tools and techniques concentrate on static, partial descriptions of business infrastructures. Dynamic system behavior is generally unknown until the system is in construction or in operation, thus, limiting the possibilities for improvement. Unacceptable performance issues may become exacerbated as the system evolves with the addition of new business solutions that must be supported by the architecture.

Furthermore, when the origin of a problem resides in questionable decisions made early in the development process, the cost of improvement could become prohibitive when a redesign of the business infrastructure is required at some level. A tremendous amount of investment may be lost due to the design of unacceptable infrastructures.

SUMMARY

The present invention provides a system and method of predictive modeling for managing decisions for business enterprises.

According to a first aspect of the invention, a system and method of predictive modeling is provided that includes (i) providing a description of infrastructure components that support one or more business solutions in a business enterprise; (ii) from the description, generating a predictive model that mathematically expresses dynamic characteristics and behavior of the infrastructure components; (iii) generating performance metrics from the predictive model for each of the infrastructure components; and (iv) translating the performance metrics into enterprise decision metrics or indicators that correspond to service, performance and financial states of the business enterprise.

According to particular embodiments, the predictive model mathematically expresses the dynamic characteristics and behavior of each infrastructure component as including direct effects from a first set of infrastructure components and indirect effects from a second set of infrastructure components. In one embodiment, the predictive model is generated by, for each infrastructure component, (i) generating a mathematical expression of the dynamic characteristics and behavior of the infrastructure component from direct effects of the first set of infrastructure components and (ii) perturbing the mathematical expression of the dynamic characteristics and behaviors of the infrastructure component by including indirect effects of the second set of infrastructure components.

According to particular embodiments, the predictive model includes a number of layers including an enterprise layer that translates performance metrics generated from the predictive model into enterprise decision metrics or indicators that correspond to the service, performance and financial states of the business enterprise.

Preferably, the predictive model can also include business, application, and system layers. The business layer mathematically expresses the dynamic characteristics and behaviors of business processes that support each business solution. The application layer mathematically expresses the dynamic characteristics and behaviors of software components that support one or more of the business processes in the business layer. The system layer mathematically expresses the dynamic characteristics and behaviors of hardware components that support one or more of the software components in the application layer. Performance metrics can be generated for each of the infrastructure components at the business, application, and system layers of the predictive model.

According to a second aspect of the invention, a system and method of predictive modeling is provided that includes (i) providing a description of infrastructure components that support one or more business solutions; (ii) from the description, generating a predictive model that mathematically expresses dynamic characteristics and behavior of the infrastructure components. To generate the predictive model, a mathematical expression is generated for each infrastructure component that expresses the dynamic characteristics and behavior of the infrastructure component based on direct effects of the first set of infrastructure components. Each mathematical expression is then perturbed by including indirect effects of the second set of infrastructure components.

According to particular embodiments, the predictive model includes a plurality of layers. For each of the one or more business solutions, business, application, and system layers of the predictive model are generated from the description. Each layer mathematically expresses the dynamic characteristics and behavior of each infrastructure component associated with the layer as including direct effects from a first set of infrastructure components and indirect effects from a second set of infrastructure components; and generating performance metrics for each of the infrastructure components at each layer.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not nec

Figure 6F:
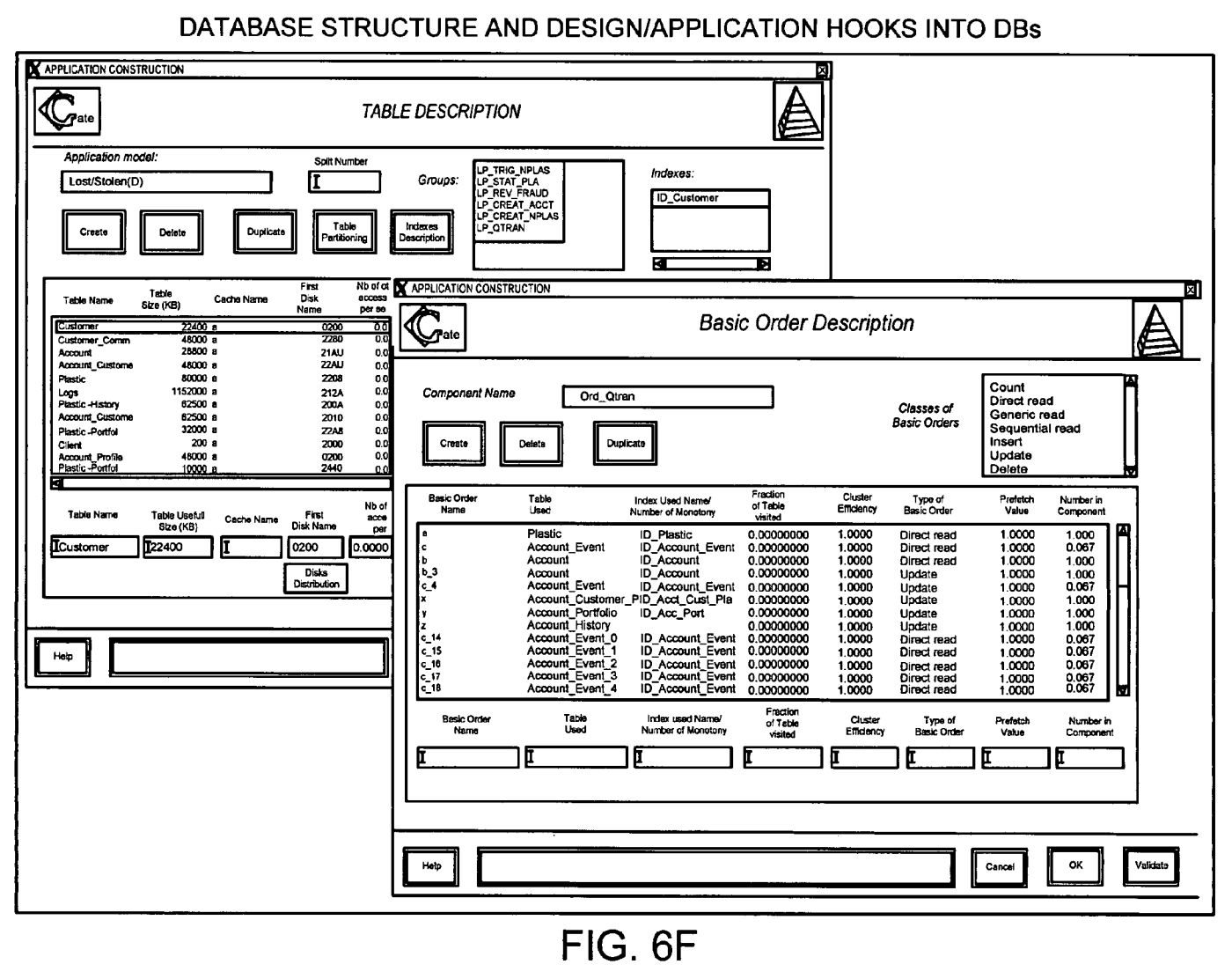

FIGS. 6A-6H are diagrams that represent methods for providing descriptive input regarding a business infrastructure according to one embodiment;

FIG. 7 is a conceptual diagram illustrating the layers represented in a predictive model according to one embodiment;

Figure 8F:
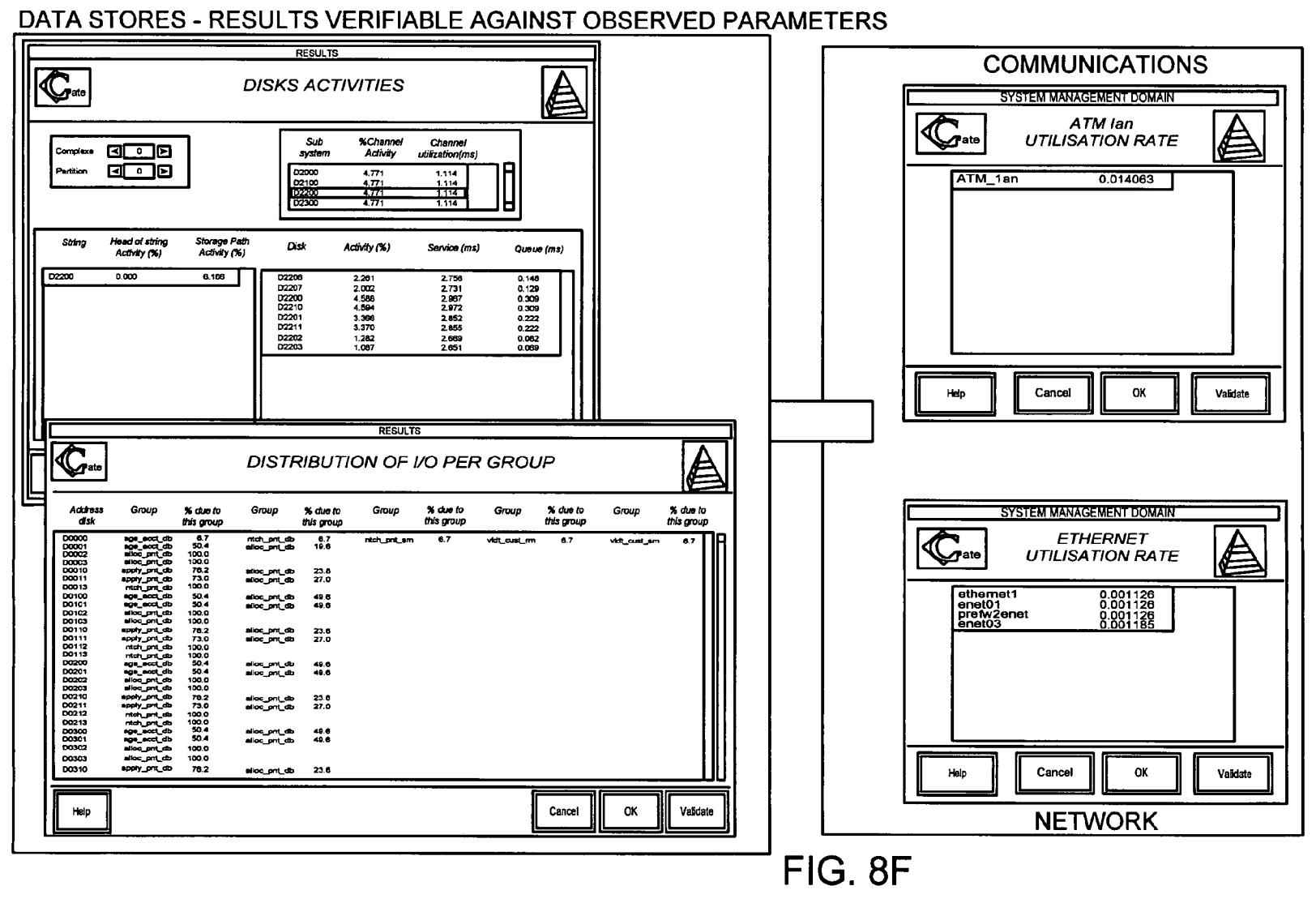

FIGS. 8A-8F are diagrams illustrating user interfaces that express performance metrics at business, application, and system infrastructure layers of a predictive model according to one embodiment;

FIGS. 9A-9D is a diagram illustrating a table that describes a set of enterprise decision metrics according to one embodiment;

DETAILED DESCRIPTION OF A PREFERRED EMBODIMENT

A business executive of an enterprise may make decisions that can affect its success. Unfortunately, many times these decisions are made based on a partial view of the business infrastructure. Wrong decisions are likely to have a negative impact on the success of the enterprise.

Examples of such decisions include a decision to (i) offer a new business solution to customers, (ii) merge with another company to increase geographic presence, (iii) acquire the assets of another company, (iv) enter into a service level agreement (SLA) with guaranteed levels of service, (iv) set the premium on an insurance policy based on risk of a business failure. Each of these decisions require a strong understanding of the dynamic characteristics and behavior of the business infrastructure in order to appreciate the impact of a decision on the service, performance and financial state of a business enterprise.

The present invention is directed to a system and method of predictive modeling for managing decisions for a business enterprise. According to one aspect of the invention, performance metrics of a business infrastructure are generated from a predictive model and then translated into enterprise decision metrics that correspond to the service, performance and financial states of the business enterprise. As a result, a business executive can evaluate, support, and monitor the effect of decisions on the enterprise based on different designs and scenarios of a business infrastructure.

According to another aspect of the invention, the accuracy of the predictive modeling is improved by mathematically expressing the dynamic characteristics and behavior of each infrastructure component as a result of direct and indirect effects of the infrastructure components impacting one another. Perturbation theory is a branch of mathematics that can be used to express such behavior.

Figure 1:
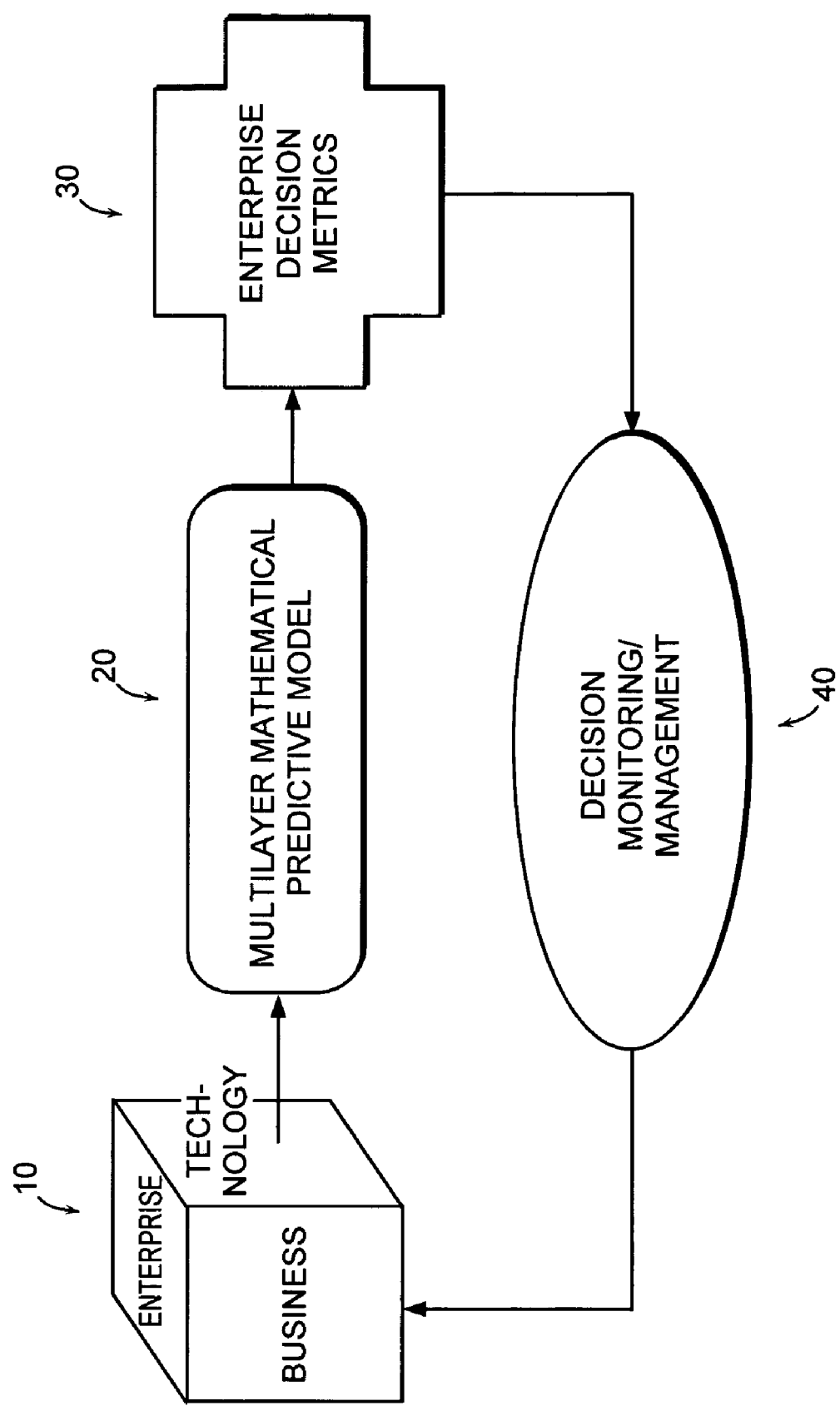
- FIG. 1 is a high level diagram illustrating a method of predictive modeling for managing decisions of a business enterprise according to one embodiment.

FIG. 1 is a high level diagram illustrating a method of predictive modeling for managing decisions of a business enterprise according to one embodiment. The method includes providing a description of the business infrastructure 20 that supports one or more business solutions. Preferably, the description 20 includes parameters that represent the enterprise, business and technological components of the business infrastructure. From this description, a predictive model 20 is constructed that mathematically expresses the dynamic characteristics and behaviors of the infrastructure components. The dynamic characteristics and behaviors include time delays, locks and contentions associated with each infrastructure component over time. From the predictive model 20, enterprise decision metrics 30 are generated for diagnostics, action planning and achievement evaluation. In particular, the enterprise decision metrics translate performance metrics of the business infrastructure in terms that a business executive can understand. For example, the enterprise decision metrics may represent the impact of a particular business infrastructure in terms of profitability, productivity, growth, and risk. Decision monitoring and management 40 is based on the decision metrics 30 and may involve modifying the design of the business infrastructure at any level (i.e., enterprise, business, technology) or evaluating the business infrastructure in different scenarios for stress and component level sensitivity testing.

By utilizing predictive modeling in decision management processes, business executives can determine whether a proposed business infrastructure will meet the requirements and conditions of the business solutions prior to implementation. Standard methodologies provide no method for validating business infrastructure designs during early stages of development.

Figure 2:
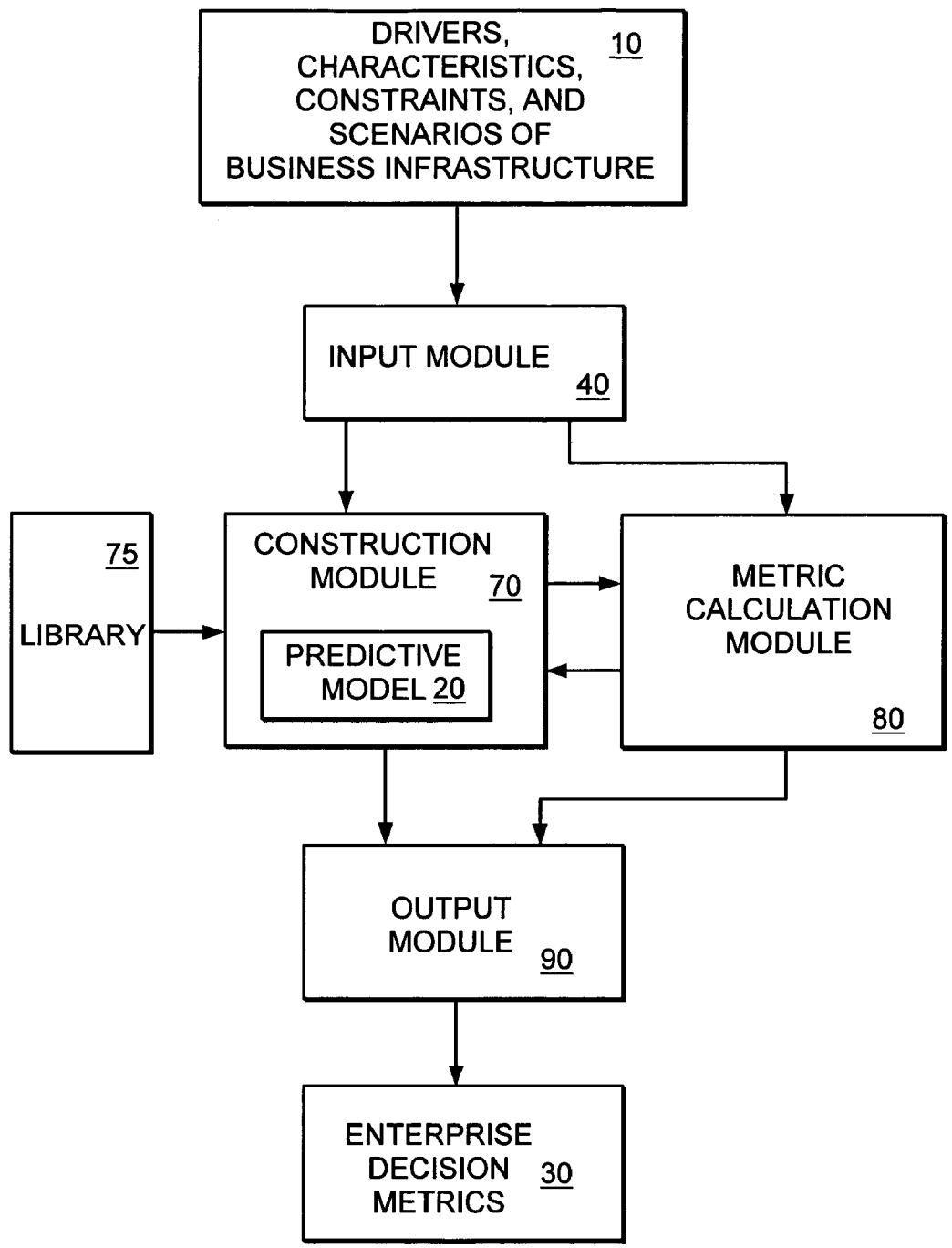
FIG. 2 is a schematic diagram that illustrates a system of predictive modeling for managing decisions for business enterprises according to one embodiment.

FIG. 2 is a schematic diagram that illustrates a system of predictive modeling for managing decisions for business enterprises according to one embodiment. The system includes an input module 60, a model construction module 70, a component model library 75, a metric calculation module 80, and an output module 90.

The input module 60 receives descriptive input 10 from an input device, a network, or a storage device. Preferably, the descriptive input 10 includes parameters that represent the components, characteristics, constraints, drivers and scenarios of a business infrastructure.

The input module 60 passes the descriptive input 10 to the construction module 70 that generates a predictive model 20 of the business infrastructure from the description. According to one embodiment, the construction module 70 is coupled to a component model library 75. The library 75 includes a number of premodeled components with each component model mathematically expressing the dynamic characteristics and behavior of a particular infrastructure component. The descriptive input 10 may include component index values that enable the construction module 70 to select the particular component models from the library 75.

The descriptive input 10 may also include parameter values that can be input as variables to the mathematical expressions of the selected component models. These parameter values may specify particular configurations of the components (e.g., partitioning of hardware servers) or external drivers and constraints (e.g., business workload events). The descriptive input 10 also identifies relationships between infrastructure components in order to combine the mathematical expressions of dependent infrastructure components. For example, the response time of an application component to a request depends on the speed of the supporting processor.

The construction module 70 then passes the predictive model 20 onto the metric calculation module 80 in order to generate the enterprise decision metrics 30 from the predictive model 20. The decision metrics 30 are then forwarded to the output module 90, which provides the decision metrics 30 to an output device, a network or a storage device. In one embodiment, the output module provides the enterprise decision metrics 30 to a display device for the designer of the business infrastructure. The enterprise decision metrics 30 represent the service, performance, and financial state of the business enterprise.

Figure 3:
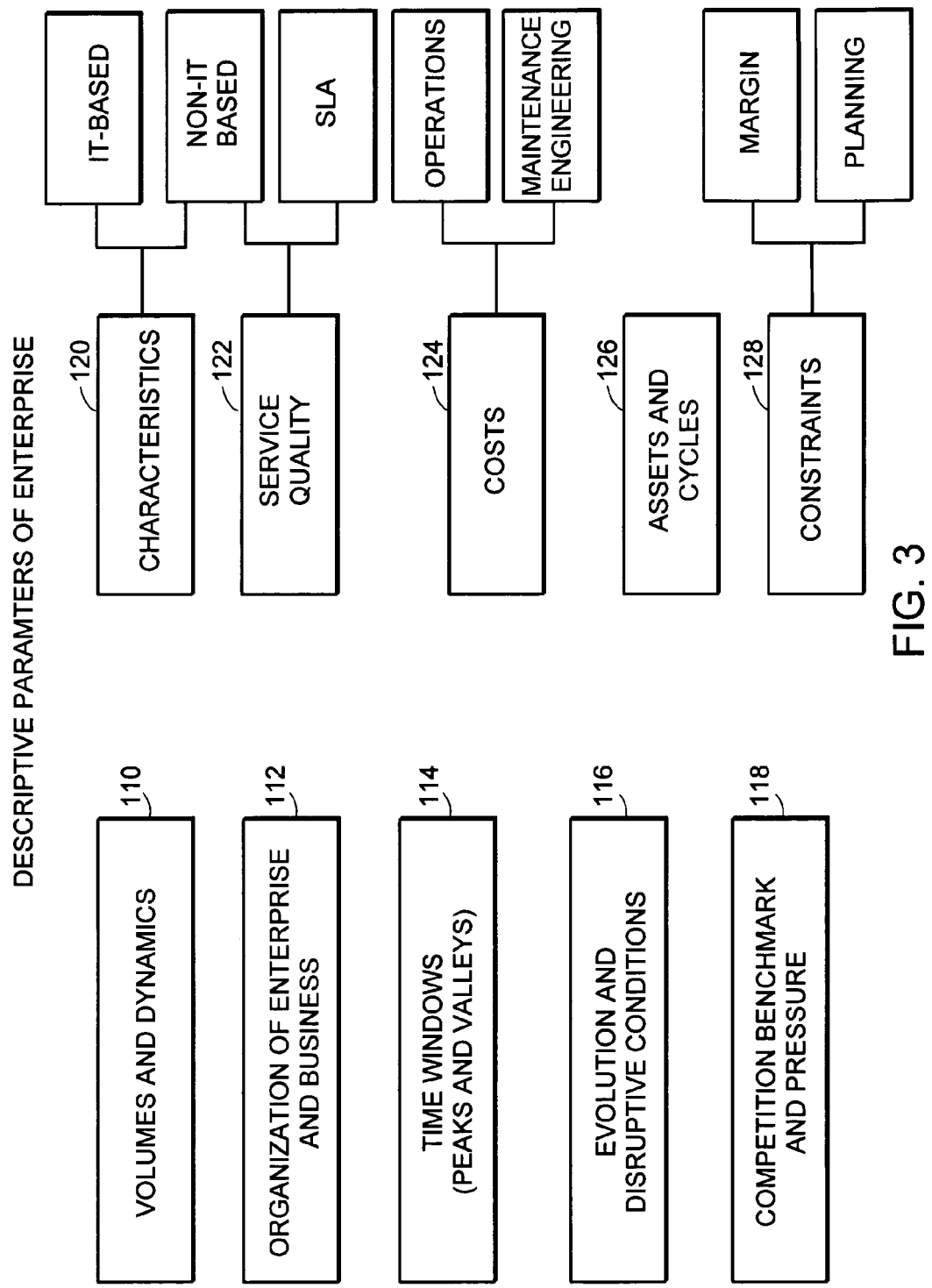
FIG. 3 is a diagram illustrating a set of parameters that describe the enterprise of a business infrastructure according to one embodiment.

FIG. 3 is a diagram illustrating a set of parameters that describe the enterprise of a business infrastructure according to one embodiment. In particular, the descriptive parameters of the enterprise include parameters representing volumes and dynamics 110, enterprise and business organization 112, time windows corresponding to peaks and valleys in business activity 114, evolution and disruptive conditions 116, competition benchmarks and pressure 118, technological and non-technological characteristics 120, service quality (e.g., SLA) 122, cost including operations and maintenance costs 124, assets and cycles 126, and constraints on margin and planning 128.

Referring back to FIG. 2, such enterprise parameters are provided as descriptive input 10 to the input module 40. Some of these enterprise parameters are subsequently passed as input to the model construction module 50 in order to generate the predictive model 20, including the enterprise and business organization 112, technological and non-technological characteristic parameters 120, and cost including operations and maintenance costs 124, for example. Other enterprise parameters are forwarded to the metric calculation module 80 in order to represent the conditions for a particular scenario, including volumes and dynamics 110 and time windows 114, for example.

Figure 4A:
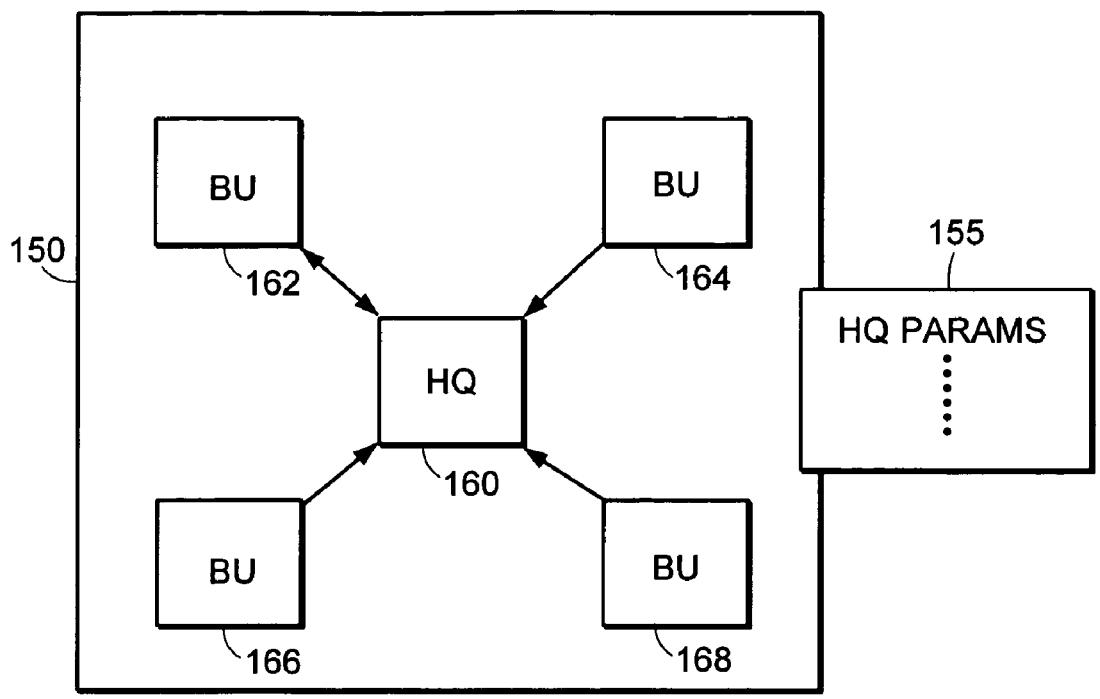
FIGS. 4A, 4B and 4C are diagrams illustrating a method for providing the descriptive input that represents a business enterprise and its businesses according to one embodiment.
Figure 4B:
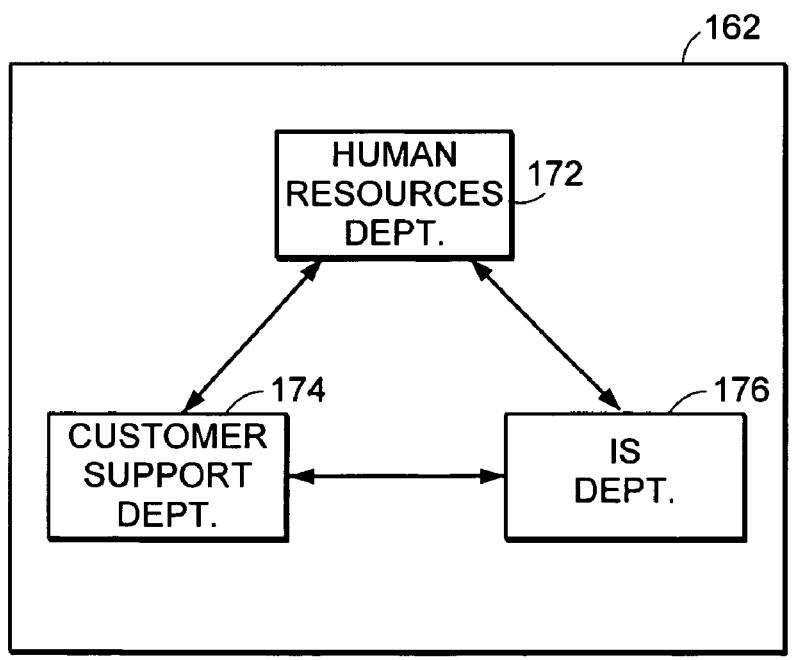
Figure 4C:
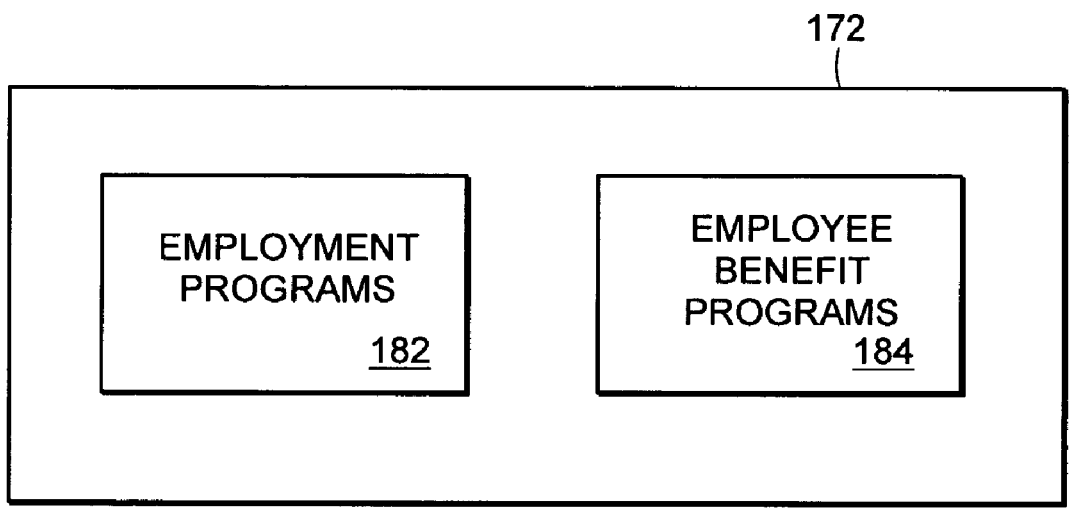

FIGS. 4A, 4B and 4C are diagrams illustrating a method for providing the descriptive input that represents a business enterprise and its businesses according to one embodiment. For example, FIG. 4A includes a graphical representation 150 of a business enterprise that is organized into a central headquarters 160 and remote business units 162, 164, 166, 168. In one embodiment, this representation can be generated by any UML (Unified Modeling Language) graphics tool, for example, by "dragging and dropping" icons that represent the business units into the graphical representation and identifying communication flows between the units with arrow icons. Specific parameters can be associated with each business unit by selecting one of the business unit icons and entering data (e.g., values, component models, links to other infrastructure components) through a sub-user interface 155 associated with a selected business unit. For example, the sub-user interface can be triggered for display to the user by "double-clicking" on a particular business unit icon.

Subsequent lower levels of enterprise organization may also be represented as needed. For example, a business enterprise may be organized in a hierarchical manner that includes multiple levels of organizational granularity. FIGS. 4A through 4C, in combination, illustrate descriptive input that represents the hierarchical organization of a business enterprise according to one embodiment. As in FIG. 4A, these graphical representations can be generated by any UML (Unified Modeling Language) graphics tool with specific parameters being entered through sub-user interfaces, for example. In particular, FIG. 4B includes a graphical representation of a departmental organization within a business unit 162. For example, the departmental organization of business unit 162 includes a human resource department 172, a customer support department 174, and an IS department 178. Each department, in turn, implements a number of business solutions. As shown in FIG. 4C, the human resources department 172 handles employment programs 182 and employee benefits programs 184.

By modeling the hierarchical organization of a business enterprise, the resulting predictive model can determine performance and enterprise decision metrics across each business unit, department, and business solution. Thus, a business executive can analyze the effects of particular decision on the business enterprise at the different organizational levels.

Specific parameters associated with a business solution may include technological characteristic parameters 120 (FIG. 3). For example, if the technological characteristic parameter indicates that the business solution includes technological components, the business solution can be further represented by an underlying information technology (IT) infrastructure.

Figure 5:
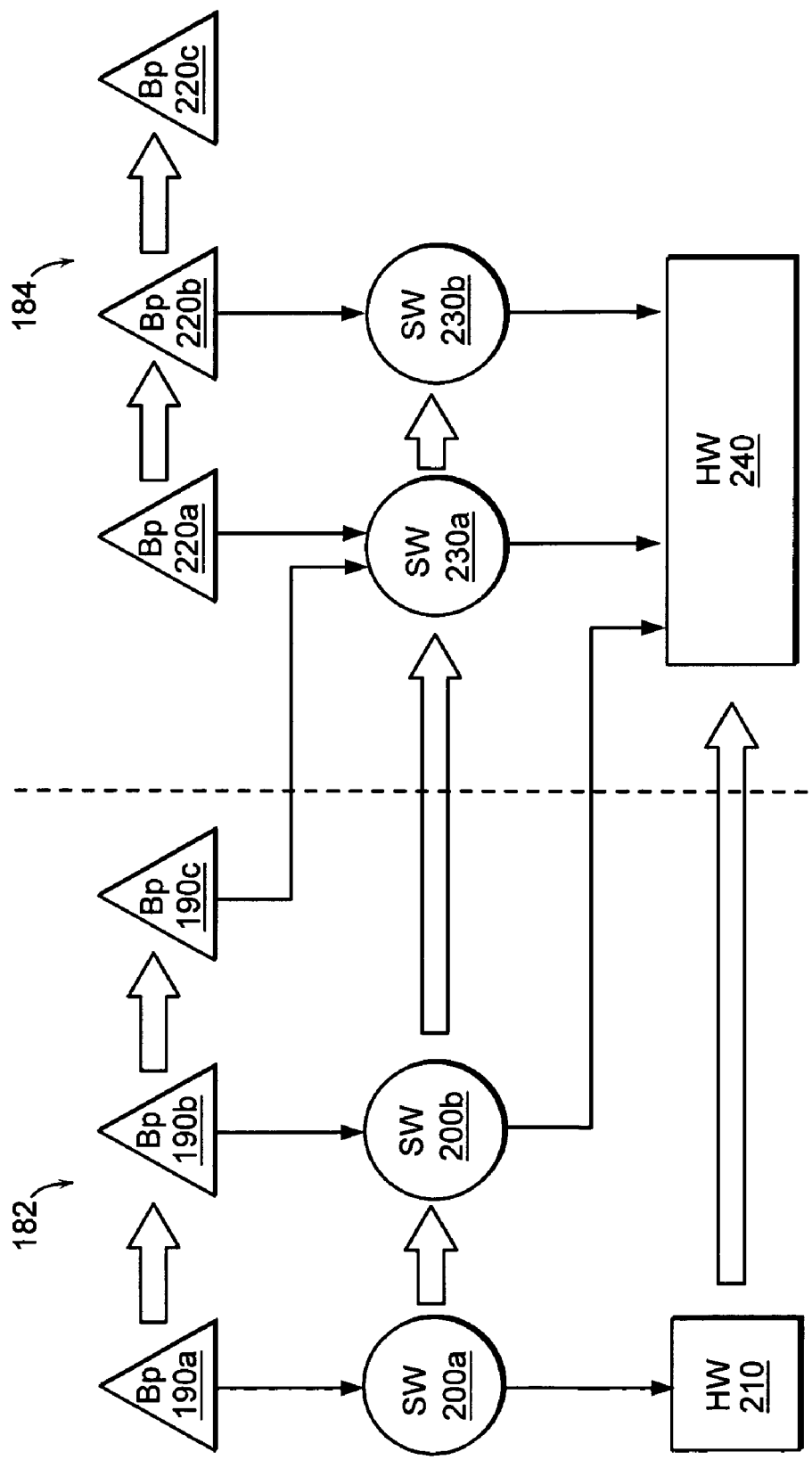
FIG. 5 is a diagram illustrating an underlying infrastructure of an enterprise business solution according to one embodiment.
Figure 6A:
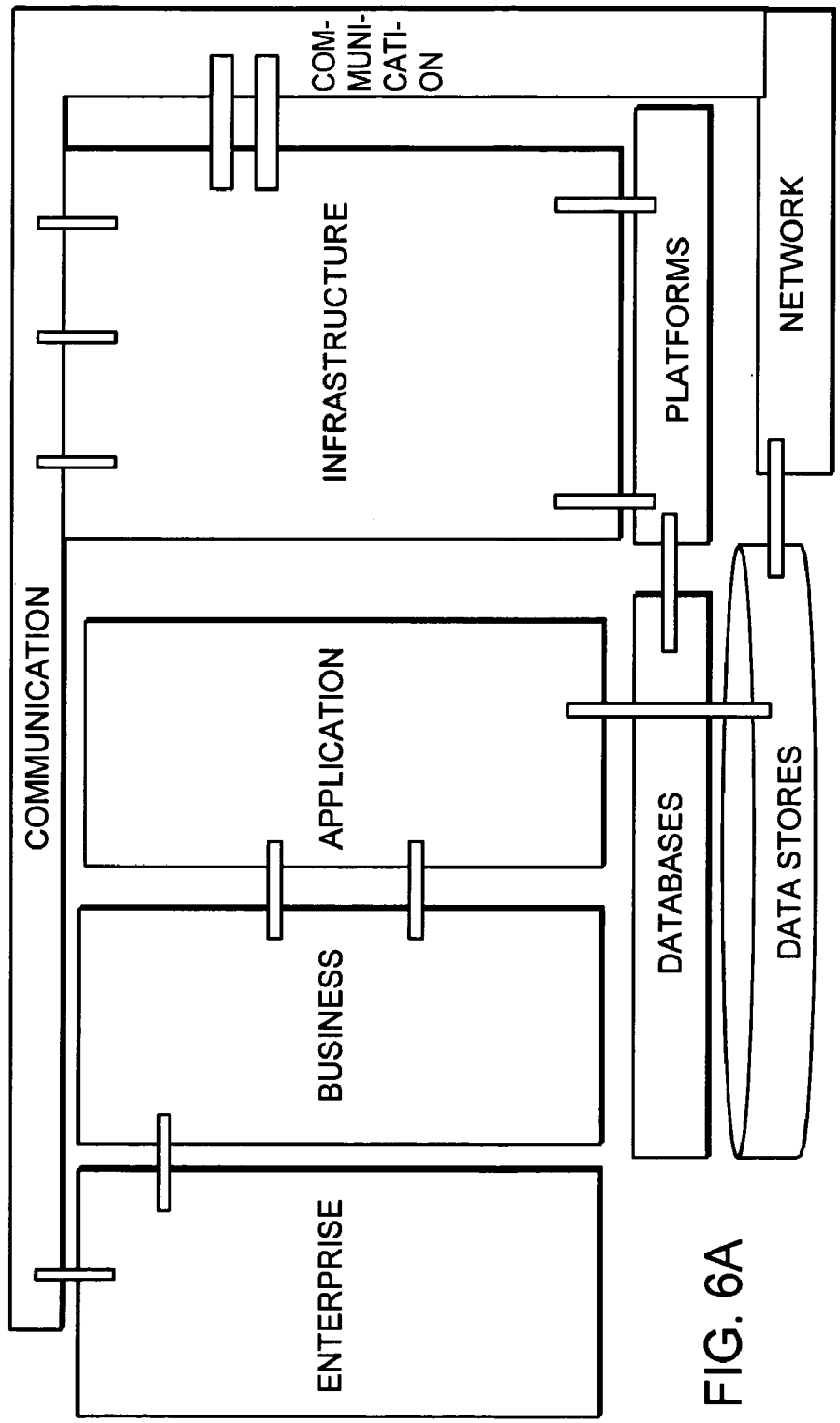
Figure 6B:
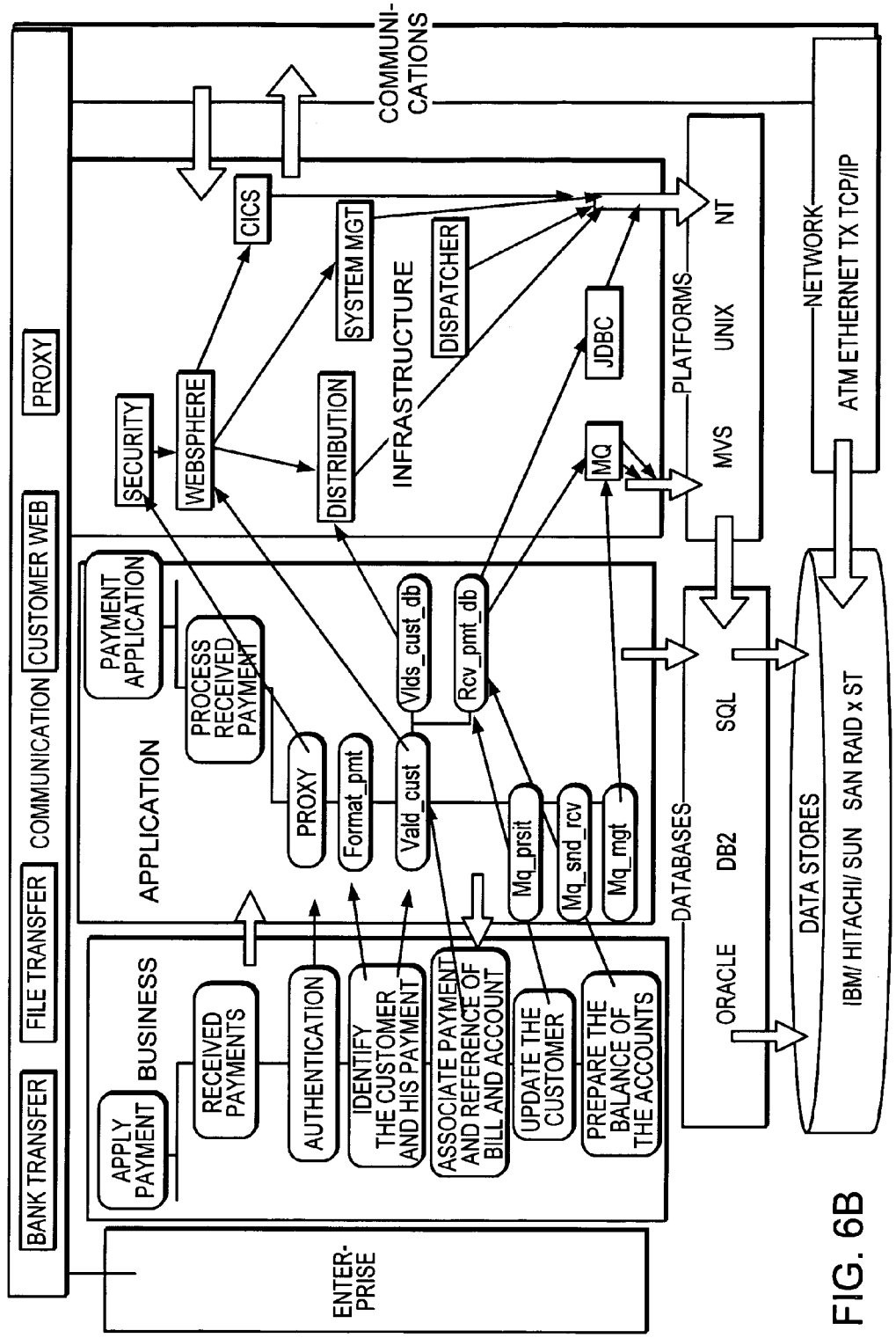
Figure 6C:
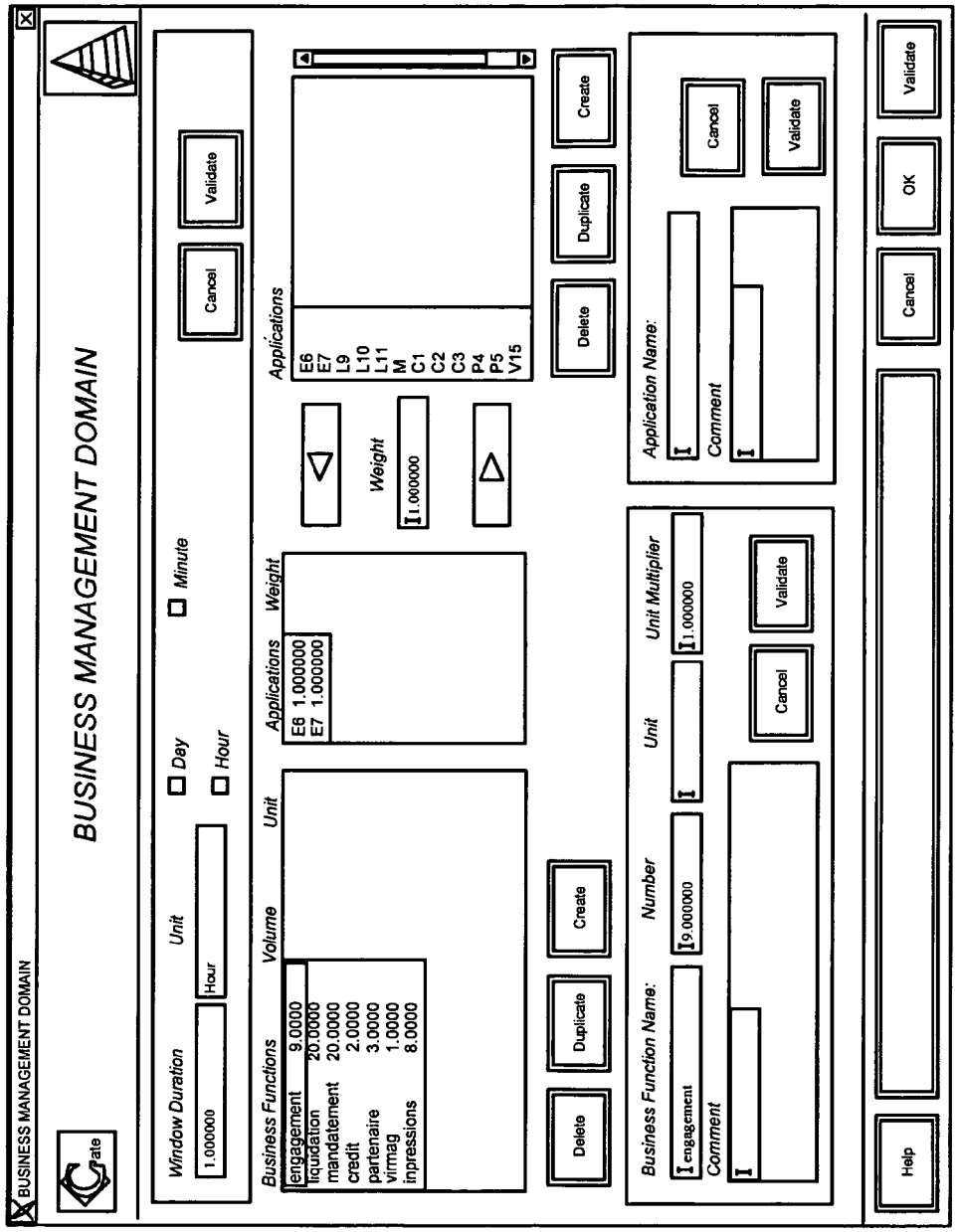
Figure 6D:
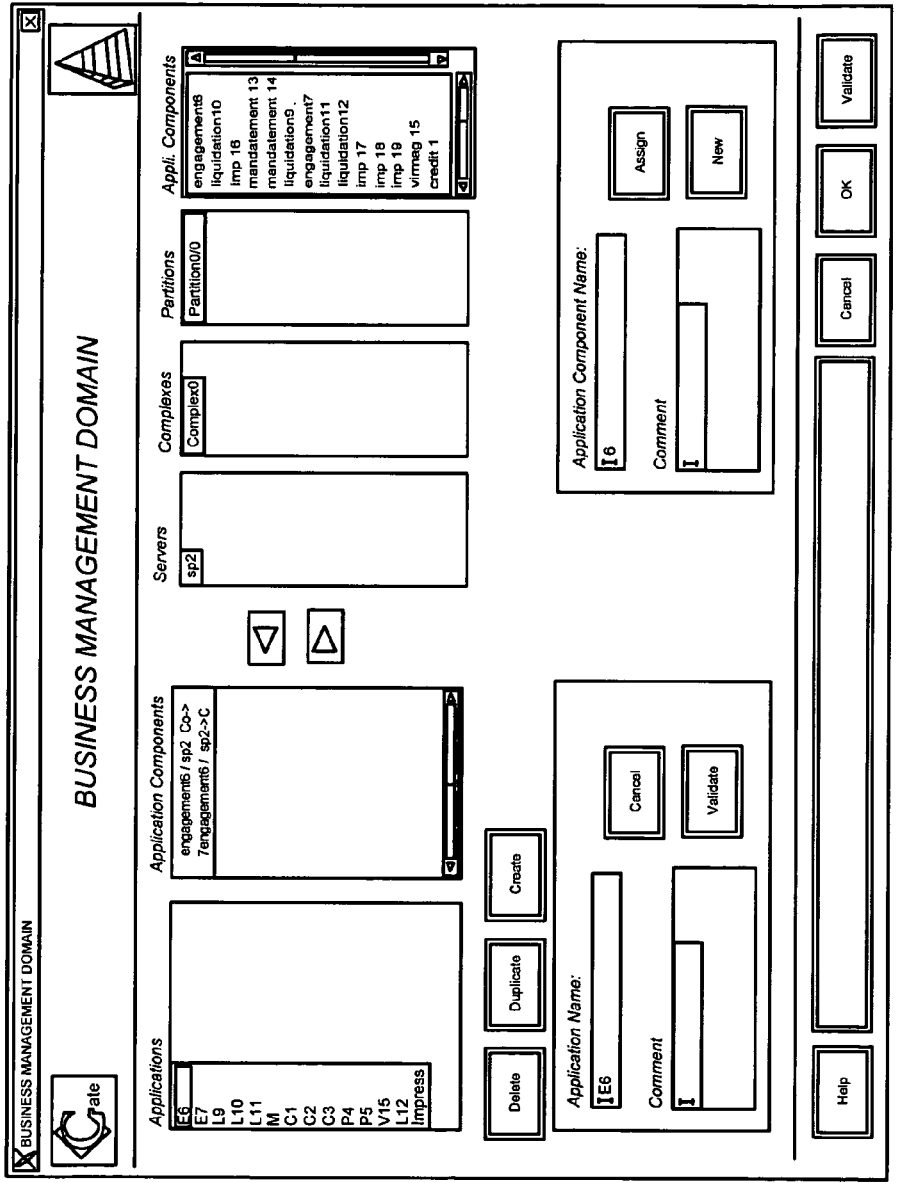
Figure 6E:
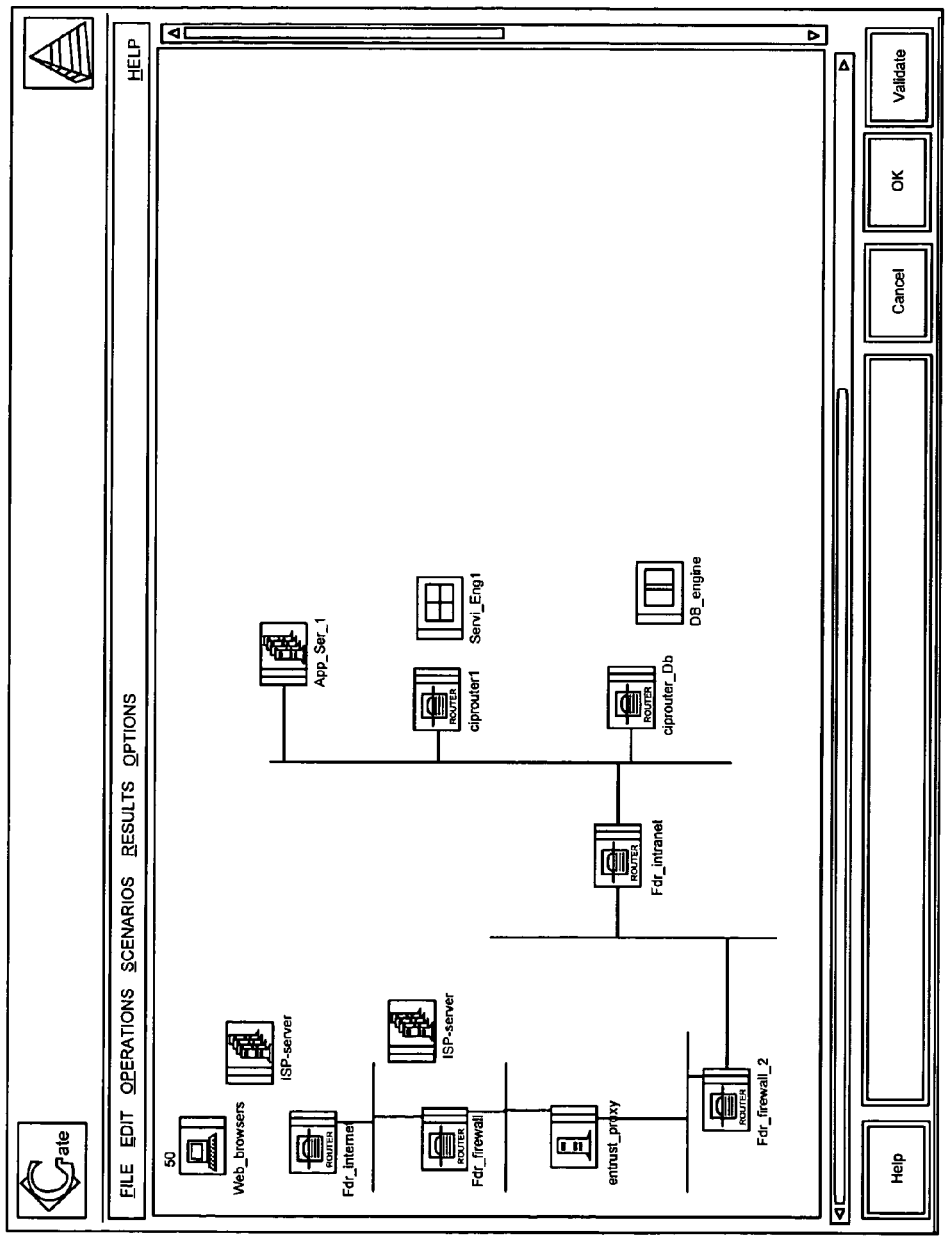
Figure 6G:
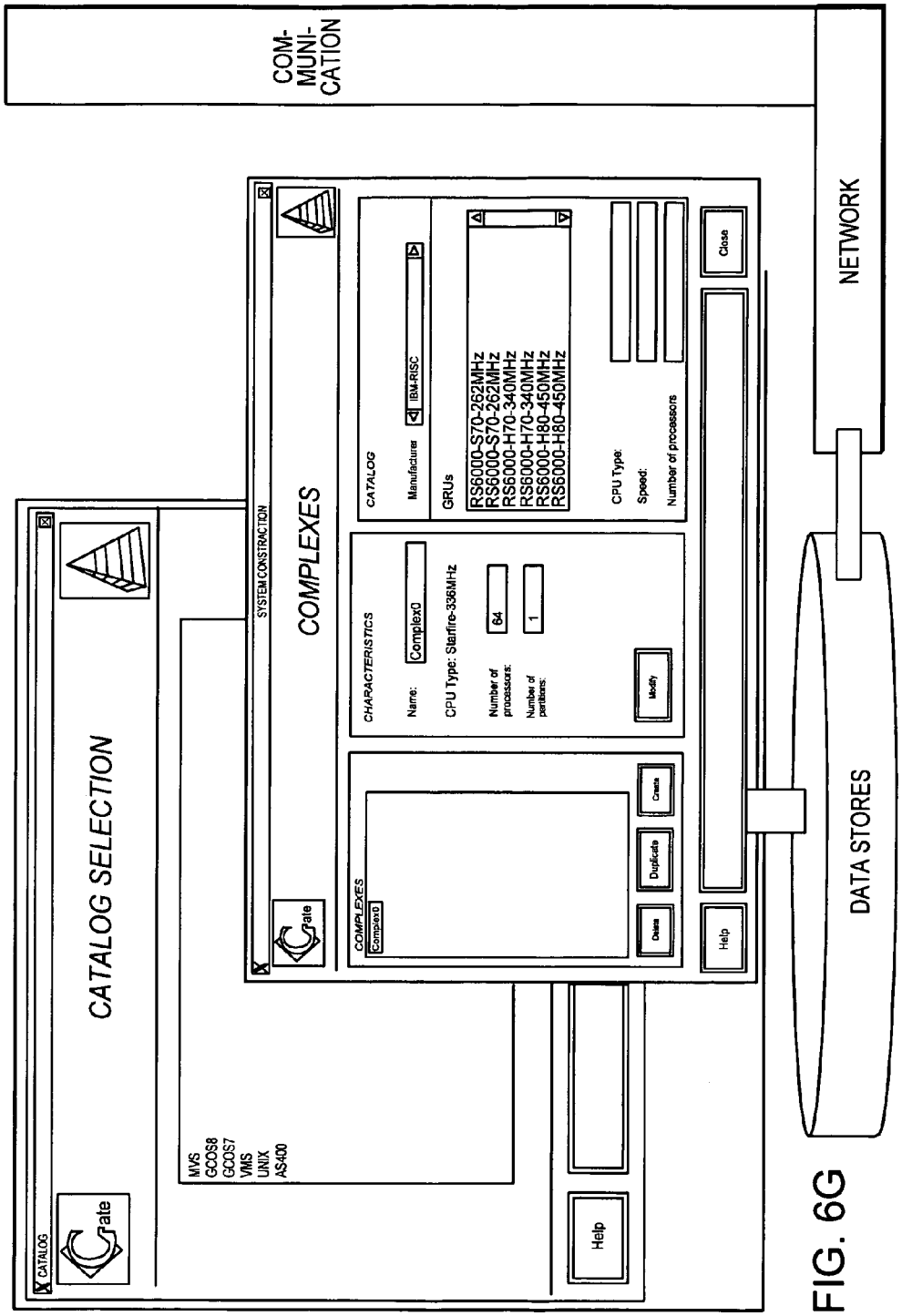
Figure 8A:
Figure 8E:
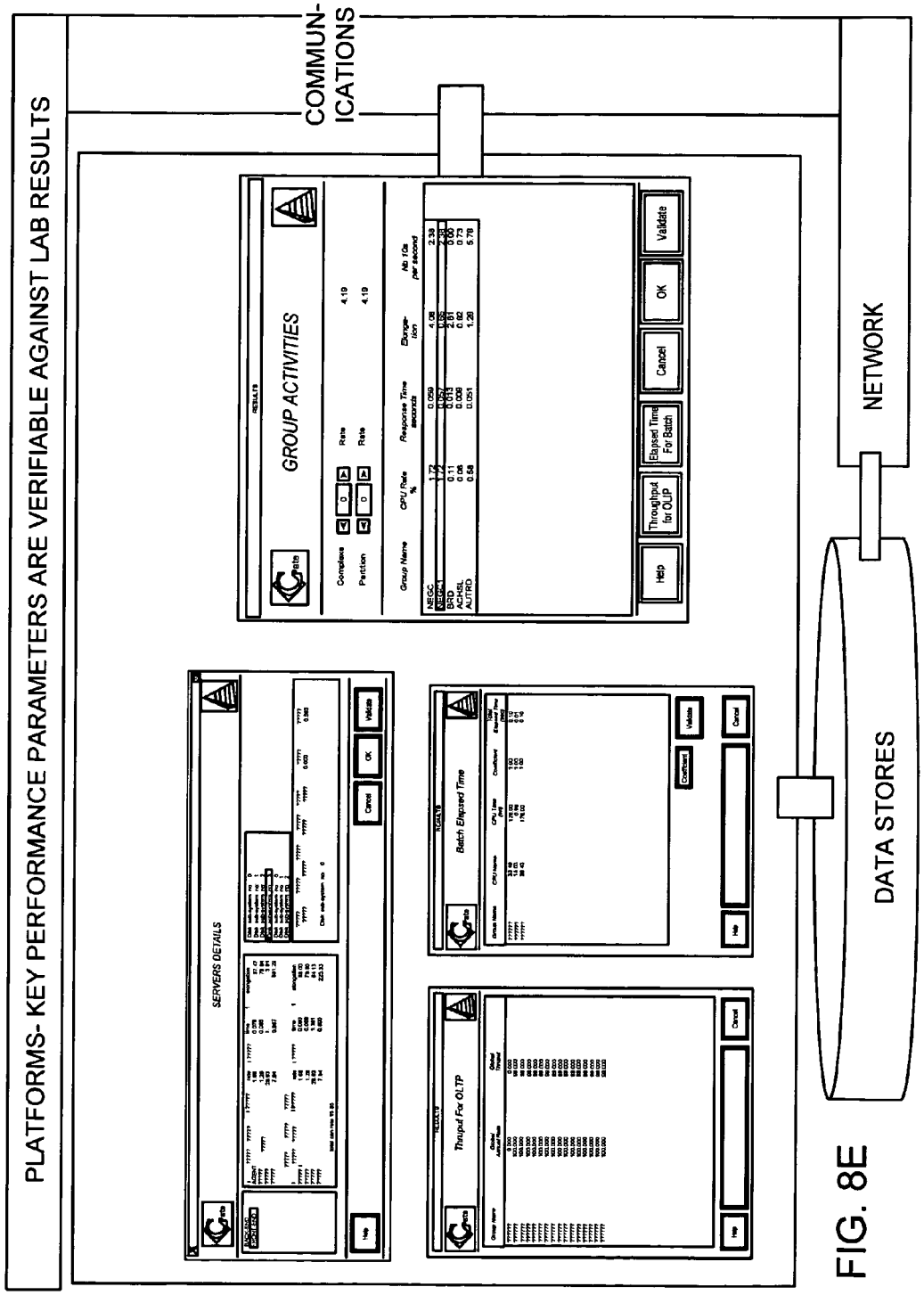

FIG. 5 is a diagram illustrating an underlying infrastructure of an enterprise business solution according to one embodiment. For example, the employee benefits program 184 and the employment program 182 of FIG. 4C may each be implemented by three business processes 190a, 190b, and 190c and business processes 220a, 220b and 220c, respectively.

Each set of business processes is supported by a set of technological components. For example, business process 190a is implemented by software component 200a, which is further supported by hardware component 210. Software components can be shared among different business processes and across business solutions. For example, software component 230a supports business processes 190c and 220a, which implement different business solutions 182 and 184. The business process 220c is a manual business process that does not have a technological infrastructure and thus can be represented as a manual delay. For purposes of clarity, only one software component and one hardware component are shown as supporting each business process. However, it should be understood that each business process may be implemented by any number of hardware and software components and the predictive modeling tool is able to express and model each component and their interactions among each other.

The descriptive input for representing each of the business, application and system (i.e., hardware/network) infrastructure components can be input to the predictive modeling system in a number of ways. For example, the business processes can be input through a graphical user interface by "dragging and dropping" icons that represent business processes and their interactions. Specific parameters can be associated with each business process by selecting one of the business process icons and entering data (e.g., values, application component models, links to other infrastructure components) through a sub-user interface associated with a selected business unit. For example, the sub-user interface can be triggered for display to the user by "double-clicking" on a particular business process icon.

For each business process, one or more software component models can be selected from a library of component models 75 to implement the business process. These software component models may mathematically express of the dynamic characteristics and behavior of accounting programs, billing programs, and other programs.

Likewise, for each software component, component models that represent the hardware component supporting the software components can be selected. Specific parameters can also be provided that describe particular configurations of the hardware and software components.

FIGS. 6A-6H are diagrams that represent methods for providing descriptive input regarding a business infrastructure according to one embodiment. For more information regarding the descriptive input for the business, application, and system infrastructures, refer to U.S. application Ser. No. 10/014,317, filed Oct. 26, 2001, entitled "System and Method for Improving Predictive Modeling of an Information System," the entire contents of which are incorporated herein by reference. From the descriptive input, a predictive model 20 is generated that mathematically expresses the dynamic characteristics and behavior of the infrastructure components individually and in combination.

FIG. 7 is a conceptual diagram illustrating the layers represented in a predictive model according to one embodiment. In particular, the predictive model 20 represents the business infrastructure as a number of layers including an enterprise layer 310, a business layer 320, an application layer 330, and a system layer 340.

Through a system of equations, each layer models the dynamic characteristics and behavior of its components individually and collectively in terms of probabilities for delays due to processing, conflicts, contentions and locks. Each layer has an effect on the dynamic characteristics and behavior expressed in the other layers as indicated by the arrows.

Based on the system of equations, the model can be used to predict the service, performance and financial state of a business infrastructure components at each layer. For example, the business workload events generated at the enterprise layer dictate the number of jobs or tasks to be performed at the business layer. The volume of jobs or tasks translates to a number of requests/responses by software components at the application layer, which in turn translates into I/O transactions at the system infrastructure layer. Conversely, the rate at which the business events can be processed depends on a number of factors including the architectural design of the business infrastructure. Specifically, delays occur at each layer due to processing, contentions for resources, locks, and conflicts. Such delays percolate up from the system infrastructure layer through the application, business and enterprise layers, and thus, limit the number of business events that can be processed within a certain time period. FIGS. 8A-8F are diagrams illustrating user interfaces that express performance metrics at business, application, and system infrastructure layers of a predictive model according to one embodiment.

In order to translate such performance metrics into terms that a business executive can understand, each infrastructure component is associated with a financial cost. For example, infrastructure components at the application and system layers can be associated with operational and maintenance costs. At the business and enterprise layers, the financial costs can include salaries and capital costs, for example.

Similarly, at the enterprise layer, a revenue can be associated with processed business events. As these financial, service and performance metrics percolate up through the layers, the predictive model is able to model the impact of a business decision.

FIGS. 9A-9D are diagrams illustrating tables that describe a set of enterprise decision metrics according to one embodiment. In particular, the decision metrics 30 can include (1) elongation ratio, (2) unit utilization ratio, (3) ceiling threshold, (4) business response time, (5) aging ratio, (6) degradation ratio, (7) non-productive ratio, (8) non-productive ratio, (9) process latency, (10) cost inflation rate, (11) margin erosion rate, (12) total-added-cost ratio, (13) uncovered-value ratio, (14) under-utilization ratio, (15) operational risk ratio, (16) inefficiency ratio, and (17) lifetime contraction ratio. Some of these metrics can also represent behavior at the underlying infrastructure layers as well. Furthermore, combinations of these metrics can be combined mathematically to provide general indicators of the health of a business enterprise as shown in FIG. 10.

Figure 10:
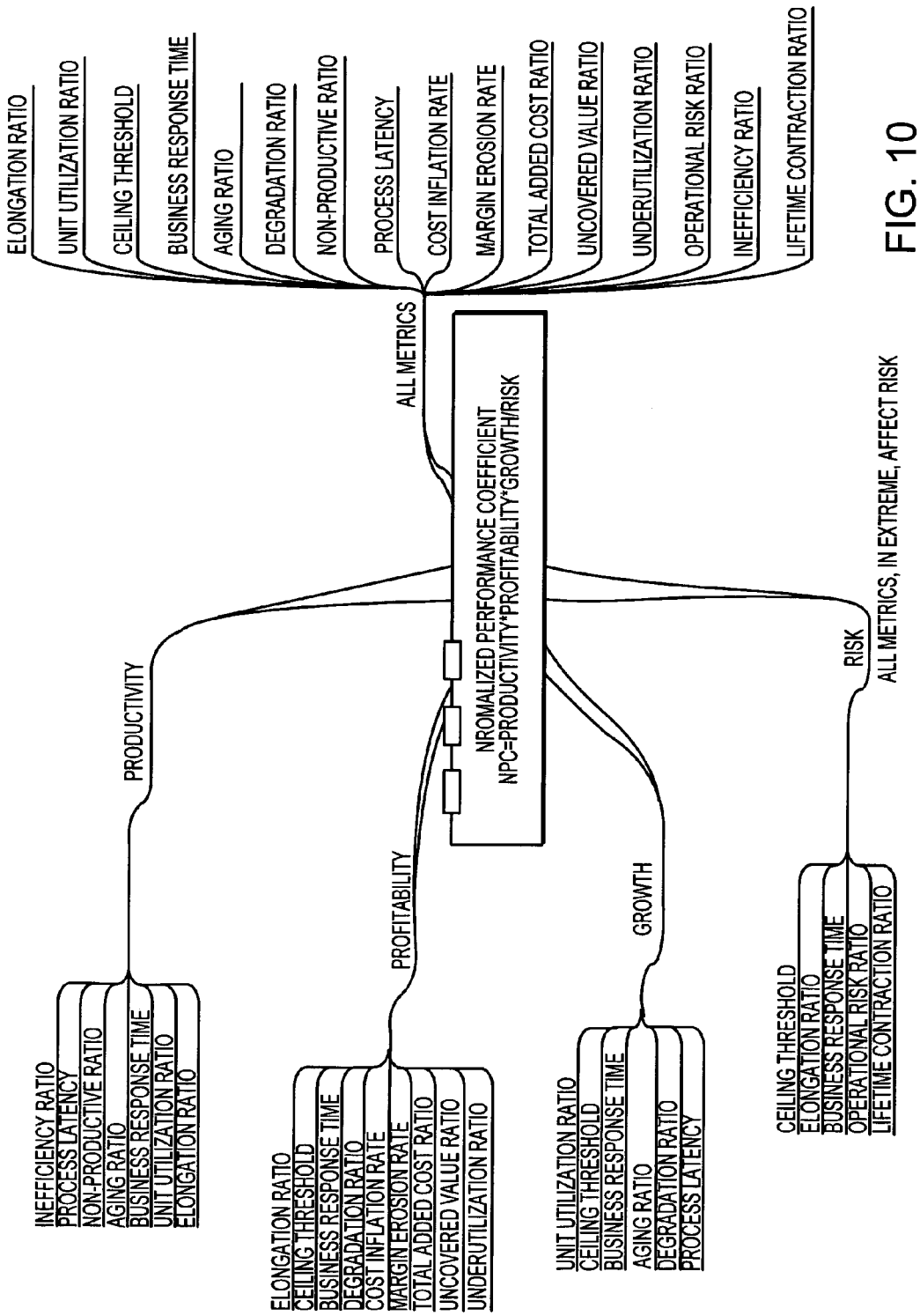
FIG. 10 is a diagram illustrating combinations of enterprise decision metrics to generate general indicators of the health of a business enterprise according to one embodiment.

FIG. 10 is a diagram illustrating combinations of enterprise decision metrics to generate general indicators of the health of a business enterprise according to one embodiment. For example, combinations of the enterprise business metrics can provide indications of productivity 410, profitability 420, growth 430 and risk 440 associated with a particular business infrastructure. For example, the profitability 420 of a business infrastructure can be represented as a combination of elongation ratio, ceiling threshold, business response time, degradation ratio, cost inflation rate, margin erosion rate, total added cost ratio, uncovered value ratio, and under-utilization ratio. Therefore, if the profitability corresponds to a low value, the designer of the business infrastructure may analyze each of the constituent metrics to determine which metric(s) are causing the reduction in profitability. The normalized performance coefficient (NPC) is a global indicator of a business infrastructure to meeting business requirements. According to one embodiment, the NPC is the product of the profitability, productivity, and growth indicators divided by risk. Other global indicators can include (1) Effective Cost Advantage, (2) Effective Value Advantage, (3) Effective Response Elongation, and (4) Overall Scalability Index.

Effective Cost Advantage is the percentage of cost inflation (or deflation) that will yield the business growing for at least the same proportion. For example, if cost is increased by 30% due to re-engineering the business enterprise, the revenue stream will consequently increase by at least 30%.

Effective Value Advantage represents the growth in value between two points where major change in revenue results from investing in moving the system dynamics between the two points. The investment might change the configuration in short, medium, or long terms but the Effective Value Advantage will represented a normalized parameter that expresses the resultant earnings per share, profit, assets, market mane, and total return to investors.

Effective Response Elongation is an indicator of the delays that are independent of service requirements. By definition, this indicator is the time to deliver divided by the time to execute without contention or conflict minus one. The Effective Response Elongation can be used to assess the scope of improvement opportunities. When its value is close to zero, there are few improvement opportunities that can take place. If the value is higher than one, serious actions must be taken in order to improve the service and avoid rapid degradation.

Overall Scalability Index is a measure of the ability of structure to replicate the same cost and performance characteristics each time addition load will be in service. The index varies from 1 to 100, where 100 corresponds to full replication and 0 corresponds to no replication. For example, a scalability index of 0.85 means that we need 15% addition resource contingencies added to replicate percentages with the new workload. A fully scalable system will closely replicate the same workload growth.

Embodiments of the present invention can be applied in a number of situations that involve decisions that can significantly impact the success of a business enterprise. According to one example, embodiments of the invention can be used during outsourcing deals. In a typical outsourcing deal, three stages are involved: (1) a pre-assessment of the client environment, processes, resources and assets; (2) a due diligence phase during the preparation of the request for proposals, proposal negotiation and contract definition; and (3) the contract execution. In each one of the above stages a high level of uncertainty exists. Millions of dollars are spent to manage satisfactorily manage the pre-assessment of the client environment and perform the lengthy due diligence and proposal generation, which may result in the threat and real risk of margin erosion during the third stage.

With the embodiments of the invention, the predictive model will show limits at each layer (enterprise, business, IT infrastructure) and identify issues to assess during the first stage. After collecting the appropriate data regarding the business infrastructure, the predictive model can reveal a true and fact based representation of the client environment, processes, resources and assets. Scenario analysis of the predictive model results in ceilings and therefore contingencies being determined for the following stages of the outsourcing deal. The predictive model can also be used to support the engineering effort by defining improvement actions and enhancement trails in order to increase margin and justify business cases for the third stage.

According to another aspect of the invention, the accuracy of the predictive modeling is improved by mathematically expressing the dynamic characteristics and behavior of each infrastructure component as a result of direct and indirect effects of the infrastructure components impacting one another. Perturbation theory is a branch of mathematics that can be used to express such behavior.

The metrics that represent the critical behavior and evolution of enterprise, business, application and system infrastructures and that support related decisions are continuously perturbed by a variety of effects of different nature. These effects are small if taken separately but can become large if they are taken collectively. In particular, the metrics associated with each infrastructure component can be impacted significantly through direct and indirect perturbation effect.

Figure 11:
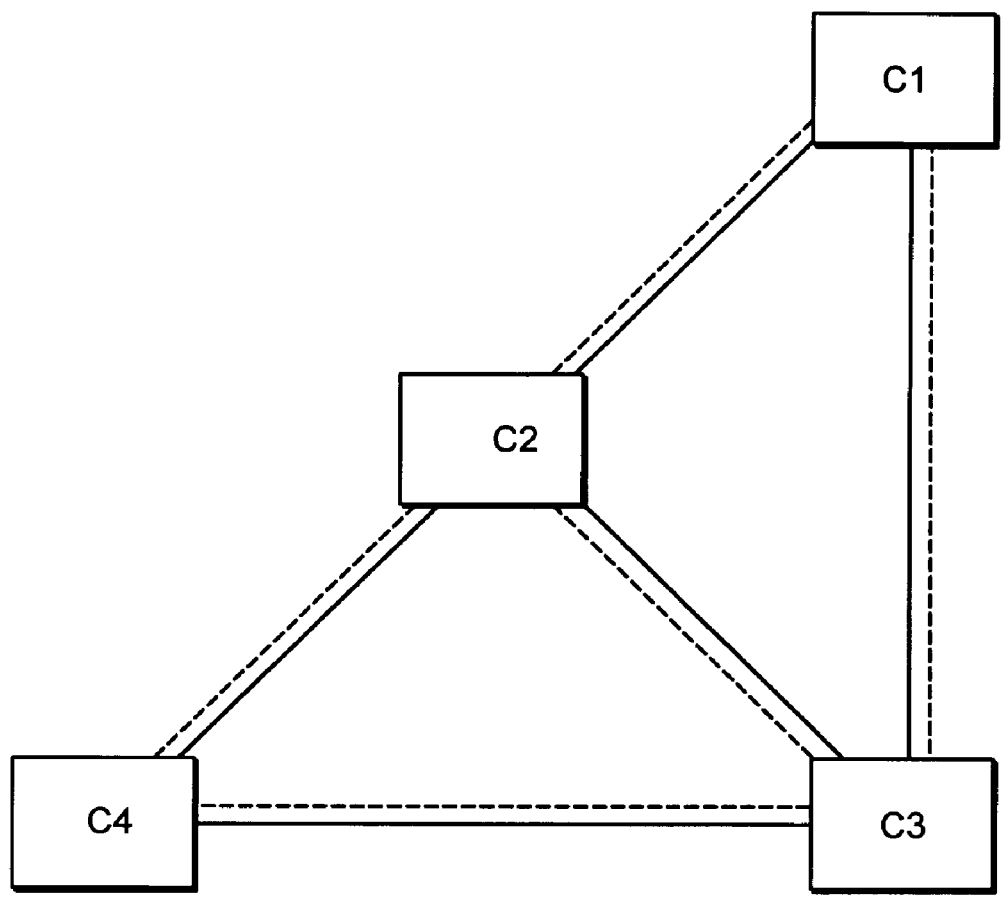
FIG. 11 is a schematic diagram illustrating direct and indirect perturbation effects on infrastructure components within a business enterprise according to one embodiment.

FIG. 11 is a schematic diagram illustrating direct and indirect perturbation effects on infrastructure components within a business enterprise according to one embodiment. As shown, infrastructure component c1 interacts directly with components c2 and c3. Thus, the performance of component c1 is directly effected by components c2 and c3. Because component c1 does not directly interact with component c4, there is no direct effected on component c1 by component c4. However, component c4 indirectly effects the performance of component c1 because it contends for resources on components c2 and c3. Thus component c1's ability to access those resources are indirectly impacted by component c4. Likewise, component c3 also contends for resources on component c2. Thus, component c3 has an indirect effect on component c1 as well as a direct effect. For example, FIGS. 9A-9D identify the possible causes of direct and indirect perturbation effects on each of the enterprise business metrics.

While most dynamic perturbing phenomena are generated randomly in the system, there exist sufficient observations to show that their impact follow and might well be represented through deterministic solution where time represent the independent variable for the system of partial differential equations that express the perturbation effects.

Figure 12:
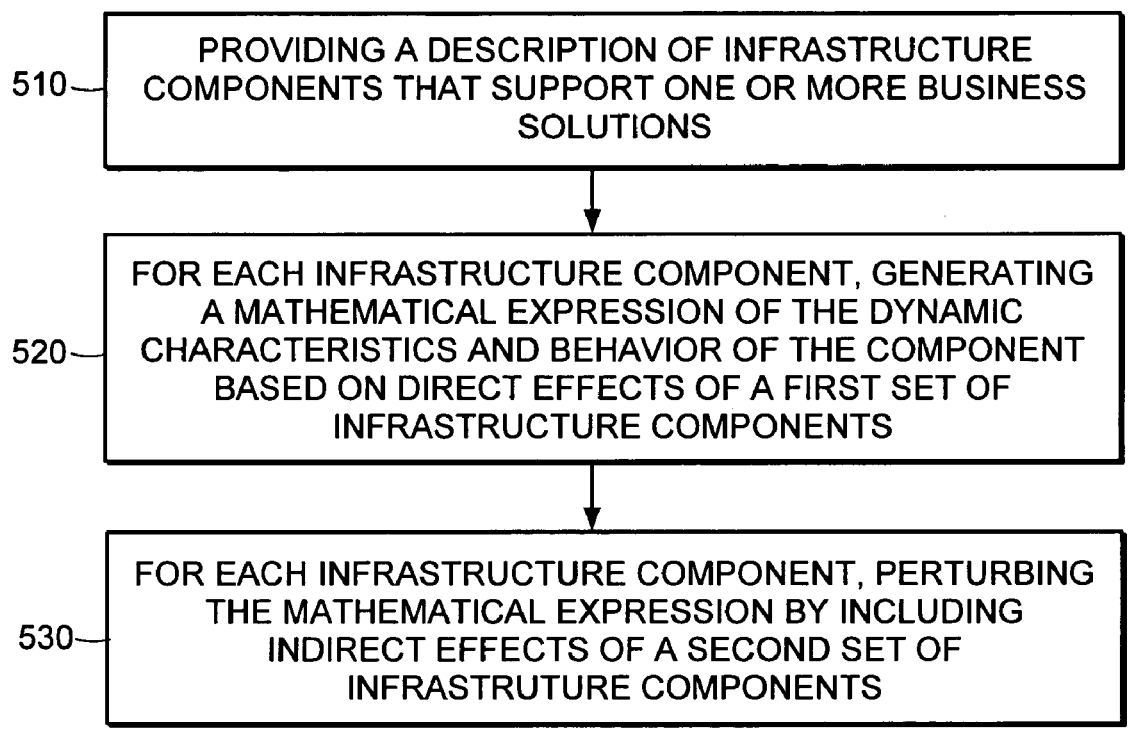
FIG. 12 is a diagram illustrating a method of improved predictive modeling using perturbation theory according to one embodiment.

FIG. 12 is a diagram illustrating a method of improved predictive modeling using perturbation theory according to one embodiment.

At 500, a description of the infrastructure components that support one or more business solutions is provided. This description can be provided in the same manner previously described.

At 510, for each infrastructure component, a mathematical expression of the dynamic characteristics and behavior of the component based on direct effects of a first set of infrastructure components, including the component itself, can be generated. Analytically different causes can be expressed either directly or indirectly impacting a perturbing function in proper mathematics that are the best fit to represent such function. For example, the mathematical expression may be based on queuing, stochastic or general probability theory to express and determine service impact on response time and cost. Deterministic mathematics or set algebra may be used to express the availability of resources to process all requests. Mean value analysis or again stochastic processes may also be used to represent latencies and delays for complex communication with external systems.

At 520, for each infrastructure component, the mathematical expression is perturbed by including indirect effects of a second set of infrastructure components.

Metric calculation can be used at each layer of the predictive model. In particular, analytically what will be obtained from the lower levels are functions of time that represent different contributions to the perturbation problem at the top level (e.g., enterprise layer). Numerically this might be cost contributions to an overall cost inflation for a certain point of time. In this last case the problem will be reduced to a value of a parameter, such as response time or throughput, but its robustness and validity in time will be largely reduced to a single point. Conceptually, this last case is predominant in the current evaluation methods and consequently their inability to guarantee a viable decision as they ignores higher order perturbations that were truncated too early to allow their inclusions. In contrast, conserving an analytical expression in terms of the direct and indirect effects provides greater validity, better accuracy and larger interval of time and more robust solution.

For clarity, this discussion of the perturbation approach is restricted to a first order perturbation (direct and indirect) due to the small magnitudes we manipulate. However, if needed, higher order perturbation solutions can derived following a similar approach.

According to one embodiment, the perturbation theory approach involves a dynamic system of Lagrange-like partial differential equations that represent the dynamic behavior of a cost function and a solution that will capture both direct and indirect perturbations around a base of the unperturbed solution. Conceptually, the solution can be expressed with perturbation theory such that any metric X can be expressed in the form:

$$X = X_0 + \Sigma_M X_M^{(d)} + \Sigma_N X_N^{(i)}$$

where $X_0$ is the initial value of a metric (e.g., function or characteristic);

$X_M^{(d)}$ is the calculated direct impact due to M causes; and $X_N^{(i)}$ is the calculated indirect impact due to N causes.

In more detail, consider the vector:

$\sigma = \sigma(k)$ where $k=1, 2, \ldots K$ and where $\sigma_k$ is a function of time and represents the metrics that describe Corporate, Financial, Business and Technology engineering characteristics and behavior.

Further consider that:

$\sigma^{(c)}$ represents the unperturbed value of a metric, or its minimum admitted value for simplicity;

$\sigma^{(d)}$ represents a measure of a perturbed metric due to the direct impact applied on the perturbing function $X^d$; and $\sigma^{(i)}$ represents the indirect perturbation due to the perturbed affect of metrics against each other or the perturbing function $X^{(i)}$ due to an external impact.

In general the system of equations that represent the variations can have the form:

$$\frac{d\sigma}{dt} = X^{(c)}(\sigma^{(c)}) + X^d(\sigma^{(d)}) + X^i(\sigma^{(i)})$$

where $X^{(c)}$ represents basic function.

Further assume that:

$\sigma'$ and $\sigma''$ are vectors representing $\sigma$ through different coordinates and that $\sigma^{(0)}$, $\sigma'^{(0)}$, and $\sigma''^{(0)}$ represent the unperturbed values of a metric. Then, the first order direct perturbation is:

$$\frac{d\sigma}{dt} = \sum_{k=1}^{K} \frac{dX^{(c)}}{d\sigma_k}(\sigma_k^{(c)}, \sigma_k'^{(0)})\sigma_k^{(d)} + X^{(d)}(\sigma_k^{(c)}, \sigma_k'^{(0)}, \sigma_k''^{(0)}) \quad (1)$$

and the first order indirect perturbation is:

$$\frac{d\sigma^{(i)}}{dt} = \sum_{k=1}^{K} \frac{dX^{(c)}}{d\sigma_k}(\sigma_k^{(c)}, \sigma_k'^{(0)})\sigma_k^{(i)} + \sum_{k=1}^{K} \frac{dX^{(c)}}{d\sigma_l'^{(0)}}\sigma_k'^{(i)} \quad (2)$$

This separation seems artificial from theoretical point of view, but it is natural from practical point of view as the origin of perturbation on $X^{(d)}$ and $\sigma^{(i)}$ are different. Next, $$\sigma'^{(i)} = \sum_{k=1}^{K}\sum_{n=1}^{m} C_{k,n}^{(i)} \exp \pm \Sigma(n_n^* \chi_n)$$

$C_{k,n}^{(i)}$ a matrix of numerical vectors, $n_1^*, n_2^*, \ldots n_m^*$ are normalization constants and $\chi_1, \chi_2, \ldots \chi_m$ are the perturbing variables (function in time).

Therefore:

$$\frac{dX^{(c)}}{d\sigma_k}, X^{(d)}$$

and $$\sum_{k} \frac{dX^{(c)}}{d\sigma_k'^{(0)}} \sigma_k'^{(i)}$$

are known functions in time, and can solve the two system equations (1) & (2) in the form:

$$\frac{d\sigma}{dt} = U(t)\sigma + v(t) \quad (3)$$

where $U(t)$ is a square matrix ($K \times K$) and $v(t)$ is a known vectorial function.

The matrix is determined by:

$$\frac{dY}{dt} = U(t)Y \quad (4)$$

with $Y(t_o) = I$ (5)

where I is a unit matrix and therefore equation (3) becomes:

$$\sigma = Y(t)\sigma(t_0) + \int_{t_0}^{t} Y(t)Y^{-1}(\tau)v(\tau)d\tau$$

with $X^{(c)} = (X_K^{(c)})$ U is specified in the form $$v(t) = \left(\left(\frac{dX_K^{(c)}}{d\sigma_k}\right)\right)$$

The formula $$\frac{d\sigma}{dt} = U(t)\sigma$$

forms the system of equations equivalent to the un-perturbed expression:

$$\frac{d\sigma^{(c)}}{dt} = X^{(c)}(\sigma_K^{(c)})$$

where the solution Y in equation (4) is known if the partial derivatives of the unperturbed problem is computed with respect to the K integration constants such as by determining $$\left(\left(\frac{d\sigma_K^{(c)}}{dC_i}\right)\right)$$

with the condition of equation (5).

Figure 13:
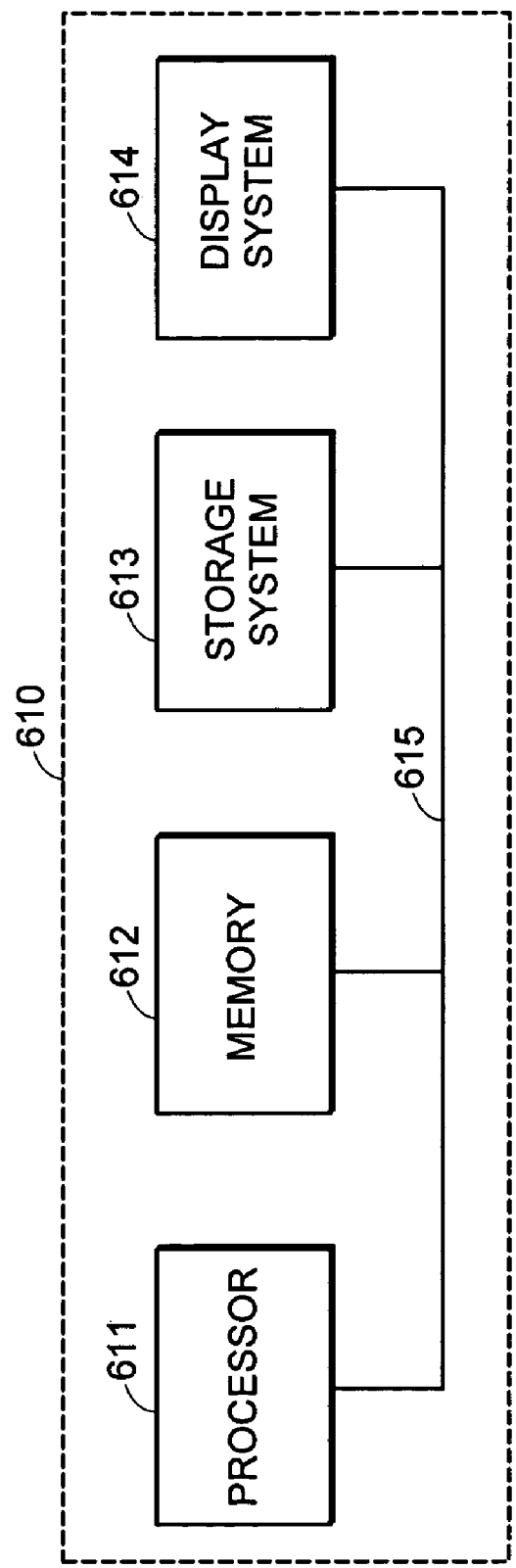
FIG. 13 is a diagram of an operating environment for embodiments of the invention.

FIG. 13 is a diagram of an operating environment for embodiments of the invention. In particular, a computer system suitable for use with the present invention is described. Computer system 610 includes at least processor 611, for processing information according to programmed instructions, memory 612, for storing information and instructions for processor 611, storage system 613, such as a magnetic or optical disk system, for storing large amounts of information and instructions on a relatively long-term basis, and display system 614, such as a computer monitor, for displaying various graphical elements that facilitate user interaction with computer system 610.

Processor 611, memory 612, storage system 613, and display system 614 are coupled to bus 615, which preferably provides a high-speed means for devices connected to bus 615 to communicate with each other.

It will be apparent to one of ordinary skill in the art that computer system 610 is illustrative, and that alternative systems and architectures may be used with the present invention. It will further be understood that many other devices, such as a network interface (not shown), and a variety of other input and output devices (not shown) may be included in computer system 610.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-implemented method of predictive modeling decisions for a business enterprise, comprising:
    providing a description of infrastructure components that support one or more business solutions in a business enterprise, each business solution representing a potential decision made for the business enterprise;
    from the description, generating a predictive model that mathematically expresses dynamic characteristics and behavior of the infrastructure components;
    generating performance metrics from the predictive model for each of the infrastructure components; and
    translating the performance metrics into enterprise decision metrics or indicators for validating the infrastructure components, the enterprise decision metrics or indicators corresponding to service, performance and financial states of the business enterprise and resulting in an evaluation of respective effects of the business solutions on the business enterprise displayed in terms understandable by a decision-maker of an enterprise.

2. The method of claim 1 wherein the predictive model mathematically expresses the dynamic characteristics and behavior of each infrastructure component as including direct effects from a first set of infrastructure components and indirect effects from a second set of infrastructure components.

3. The method of claim 2 wherein generating the predictive model comprises:
    for each infrastructure component, generating a mathematical expression of the dynamic characteristics and behavior of the infrastructure component from direct effects of the first set of infrastructure components; and
    for each infrastructure component, perturbing the mathematical expression of the dynamic characteristics and behaviors of the infrastructure component by including indirect effects of the second set of infrastructure components.

4. The method of claim 1 wherein the predictive model includes a plurality of layers, the method further comprising:
    from the description, generating an enterprise layer of the predictive model, the enterprise layer translating the performance metrics into enterprise decision metrics or indicators that correspond to the service, performance and financial states of the business enterprise.

5. The method of claim 4 further comprising:
    for each of the one or more business solutions, generating business, application, and system layers of the predictive model from the description, the business layer mathematically expressing dynamic characteristics and behaviors of business processes that support each business solution, the application layer mathematically expressing dynamic characteristics and behaviors of software components that support one or more of the business processes in the business layer, and the system layer mathematically expressing dynamic characteristics and behaviors of hardware components that support one or more of the software components in the application layer; and
    generating performance metrics for each of the infrastructure components at the business, application, and system layers of the predictive model.

6. A computer-implemented method of predictive modeling decisions for a business enterprise, comprising:
    providing a description of infrastructure components that support one or more business solutions representing potential decisions for a business enterprise;
    from the description, generating a predictive model that mathematically expresses dynamic characteristics and behavior of the infrastructure components, the predictive model being generated by:
        for each infrastructure component, generating a mathematical expression of the dynamic characteristics and behavior of the infrastructure component based on direct effects of the first set of infrastructure components; and
        for each infrastructure component, perturbing the mathematical expression of the dynamic characteristics and behavior of the infrastructure component by including indirect effects of the second set of infrastructure components, the predictive model outputting indicators of respective effects of the business solutions on the business enterprise displayed in terms understandable by a decision-maker of an enterprise.

7. The method of claim 6 wherein the predictive model includes a plurality of layers, the method further comprising:
    for each of the one or more business solutions, generating business, application, and system layers of the predictive model from the description, each layer mathematically expressing the dynamic characteristics and behavior of each infrastructure component associated with the layer as including direct effects from a first set of infrastructure components and indirect effects from a second set of infrastructure components; and
    generating performance metrics for each of the infrastructure components at each layer.

8. The method of claim 2 wherein the predictive model mathematically expresses the dynamic characteristics and behavior of each infrastructure component using perturbation theory.

* * * * *